(12) United States Patent
Yasuda et al.

(10) Patent No.: US 9,590,815 B2
(45) Date of Patent: Mar. 7, 2017

(54) RELAY SYSTEM AND SWITCHING DEVICE

(71) Applicant: Hitachi Metals, Ltd., Minato-ku, Tokyo (JP)

(72) Inventors: Makoto Yasuda, Tsuchiura (JP); Shigeru Tsubota, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 125 days.

(21) Appl. No.: 14/706,071

(22) Filed: May 7, 2015

(65) Prior Publication Data

US 2015/0333954 A1 Nov. 19, 2015

(30) Foreign Application Priority Data

May 14, 2014 (JP) .................. 2014-100920

(51) Int. Cl.
*H04L 12/24* (2006.01)
*H04L 12/707* (2013.01)
*H04L 12/26* (2006.01)
*H04L 12/939* (2013.01)
*H04L 12/46* (2006.01)

(52) U.S. Cl.
CPC .............. *H04L 12/24* (2013.01); *H04L 12/46* (2013.01); *H04L 12/4625* (2013.01); *H04L 41/0668* (2013.01); *H04L 43/0817* (2013.01); *H04L 45/22* (2013.01); *H04L 49/552* (2013.01)

(58) Field of Classification Search
None
See application file for complete search history.

(56) References Cited

U.S. PATENT DOCUMENTS

| | | | |
|---|---|---|---|
| 2011/0292931 A1 | 12/2011 | Kizawa et al. | |
| 2013/0294227 A1* | 11/2013 | Fukuzaki | G06F 11/2007 370/228 |
| 2015/0295817 A1* | 10/2015 | Xu | G06F 11/079 709/224 |

FOREIGN PATENT DOCUMENTS

| | | |
|---|---|---|
| JP | 2011-250185 A | 12/2011 |
| JP | 2012-209984 A | 10/2012 |
| JP | 2012-231223 A | 11/2012 |

* cited by examiner

*Primary Examiner* — Diane Lo
(74) *Attorney, Agent, or Firm* — Crowell & Moring LLP

(57) ABSTRACT

A first redundancy device and a second redundancy device connected to the first redundancy device are provided. A third switching device has a first link with a first port group of the first switching device and has no link with the second switching device. A fourth switching device has a second link with a first port group of the second switching device and has no link with the first switching device. Here, a communication between the first redundancy device and the second redundancy device is performed through the first link when the first link has no fault, and the communication is performed through the second link when the first link has a fault and the second link has no fault.

13 Claims, 12 Drawing Sheets

FIG. 11A

FDB: ADDRESS TABLE

| MAC ADDRESS | VLAN ID | PORT ID/MCLAG ID |
|---|---|---|
| MA1 | xxx | {MCLAG1} |
| ... | ... | ... |
| MA2 | xxx | {P[2]} |
| ... | ... | ... |

FIG. 11B

32: FAULT MONITORING TABLE

| MONITORING SUBJECT | FAULT STATE |
|---|---|
| {MCLAG1}{SWm1} | FAULT |
| {P[1a]}{SWm2} | NO FAULT |
| {P[1b]}{SWm2} | NO FAULT |
| ... | ... |
| {P[2]} | NO FAULT |
| ... | ... |

FIG. 11C

33: PORT CONTROL TABLE

| MCLAGID | CONTROL STATE |
|---|---|
| {MCLAG1} | FW |
| ... | ... |

RELAY SYSTEM AND SWITCHING DEVICE

CROSS-REFERENCE TO RELATED APPLICATION

The present application claims priority from Japanese Patent Application No. 2014-100920 filed on May 14, 2014, the content of which is hereby incorporated by reference into this application.

TECHNICAL FIELD OF THE INVENTION

The present invention relates to a relay system and a switching device, for example, a relay system to which a device-level redundancy using two switching devices is applied.

BACKGROUND OF THE INVENTION

Japanese Patent Application Laid-Open Publication No. 2011-250185 (Patent Document 1) discloses a network system in which an inter-device link aggregation is set on each link between one network device and two network devices. When a fault occurs on a dedicated line connecting two network devices, an alternative path is established by using the link aggregation path. Also, two network devices are operated as an active system and a standby system for a control plane such as synchronization of path information between the devices, and are both used in an active state for a data plane.

Japanese Patent Application Laid-Open Publication No. 2012-209984 (Patent Document 2) discloses a configuration in which an inter-device link aggregation is set on each link between a customer edge in a user network and two provider edges in a MPLS network. When both of the two provider edges receive a packet from a different provider edge, only one of the two provider edges relays the packet to the customer edge based on a rule made in advance between the two provider edges.

Japanese Patent Application Laid-Open Publication No. 2012-231223 (Patent Document 3) discloses an access system in which a link is provided each between a user L2 switch and an active L2 switch and between the user L2 switch and a reserve L2 switch. In a normal situation, the reserve L2 switch controls a port serving as a connection source of the link to the user L2 switch to a link-down state. The user L2 switch transmits a broadcast frame such as an ARP to the active L2 switch and the reserve L2 switch, thereby automatically establishing a path bypassing the port controlled to the link-down state in the reserve L2 switch.

SUMMARY OF THE INVENTION

For example, an active/standby system typified by ESRP (Extreme Standby Router Protocol) and VSRP (Virtual Switch Redundancy Protocol) has been known as a device-level redundancy using layer 2 (hereinafter, abbreviated as "L2") switching devices which carry out the L2 processes. In such a system, one of two L2 switching devices (referred to as redundancy device in this specification) is operated in an active state and the other is operated in a standby state. When a fault occurs on a link between an active L2 switching device and an opposing L2 switching device, the opposing L2 switching device switches the path to a link between the opposing L2 switching device and a standby L2 switching device. For this path switching, the opposing L2 switching device usually flushes a FDB (Forwarding Data-Base). This may lead to communication congestion or the like due to flooding.

For the solution of such a problem, for example, the system using inter-device link aggregation group (hereinafter, abbreviated as "LAG") as described in the Patent Document 1 and the Patent Document 2 is considered. In this case, since the opposing L2 switching device virtually manages inter-device LAG ports serving as connection sources to a redundancy device as a single port on the FDB, it is not necessary to perform the flushing of the FDB when a fault occurs.

Meanwhile, in particular, a communication carrier, etc. have a desire to implement detailed network management including frame transfer paths in some cases. However, when the above-mentioned redundancy device to which the inter-device LAG is applied is disposed in such a carrier network, network management may become complicated. For example, since the frames from the opposing L2 switching device to the redundancy device are distributed to the two L2 switching devices constituting the redundancy device with the LAG, it is not easy to sufficiently grasp the frame transfer paths. Such a problem becomes severer as the number of incorporated switching devices increases like in a carrier network.

Furthermore, in the carrier network, etc., a number of redundancy devices described above may be provided in some cases from the demand for high reliability. In this case, when two L2 switching devices are connected to the redundancy device, for example, a system in which one of the two L2 switching devices and the redundancy device are connected by an inter-device LAG and the other of the two L2 switching devices and the redundancy device are also connected by an inter-device LAG is used. However, the two L2 switching devices themselves need to be operated as a redundancy device in some cases. Therefore, a system capable of connecting the redundancy devices while taking into account the facilitation of the network management mentioned above is desired.

The present invention has been made in view of the problem above, and an object thereof is to provide a relay system and a switching device using a device-level redundancy capable of facilitating the network management.

The above and other objects and novel characteristics of the present invention will be apparent from the description of the present specification and the accompanying drawings.

The following is a brief description of an outline of the typical embodiment of the invention disclosed in the present application.

A relay system according to a present embodiment includes: a first redundancy device made up of a first switching device and a second switching device; and a second redundancy device made up of a third switching device and a fourth switching device and connected to the first redundancy device. The first switching device and the second switching device each have a first port group made up of one or a plurality of first ports, a second port and a bridge port, and the first switching device and the second switching device are connected to each other by a communication line via the bridge ports. The third switching device has a first link with the first port group of the first switching device and has no link with the second switching device. The fourth switching device has a second link with the first port group of the second switching device and has no link with the first switching device. Here, a communication between the first redundancy device and the second redundancy device is performed through the first link when the first link has no fault, and the communication is performed through the second link when the first link has a fault and the second link has no fault.

The effects obtained by typical embodiments of the invention disclosed in the present application will be briefly described below. That is, in a relay system and a switching device using a device-level redundancy, the network management can be facilitated.

BRIEF DESCRIPTIONS OF THE DRAWINGS

FIG. 11A is a schematic diagram of a configuration example of an address table of FIG. 10;

FIG. 11B is a schematic diagram of a configuration example of a fault monitoring table of FIG. 10;

FIG. 11C is a schematic diagram of a configuration example of a port control table of FIG. 10.

DESCRIPTIONS OF THE PREFERRED EMBODIMENTS

Figure 1:
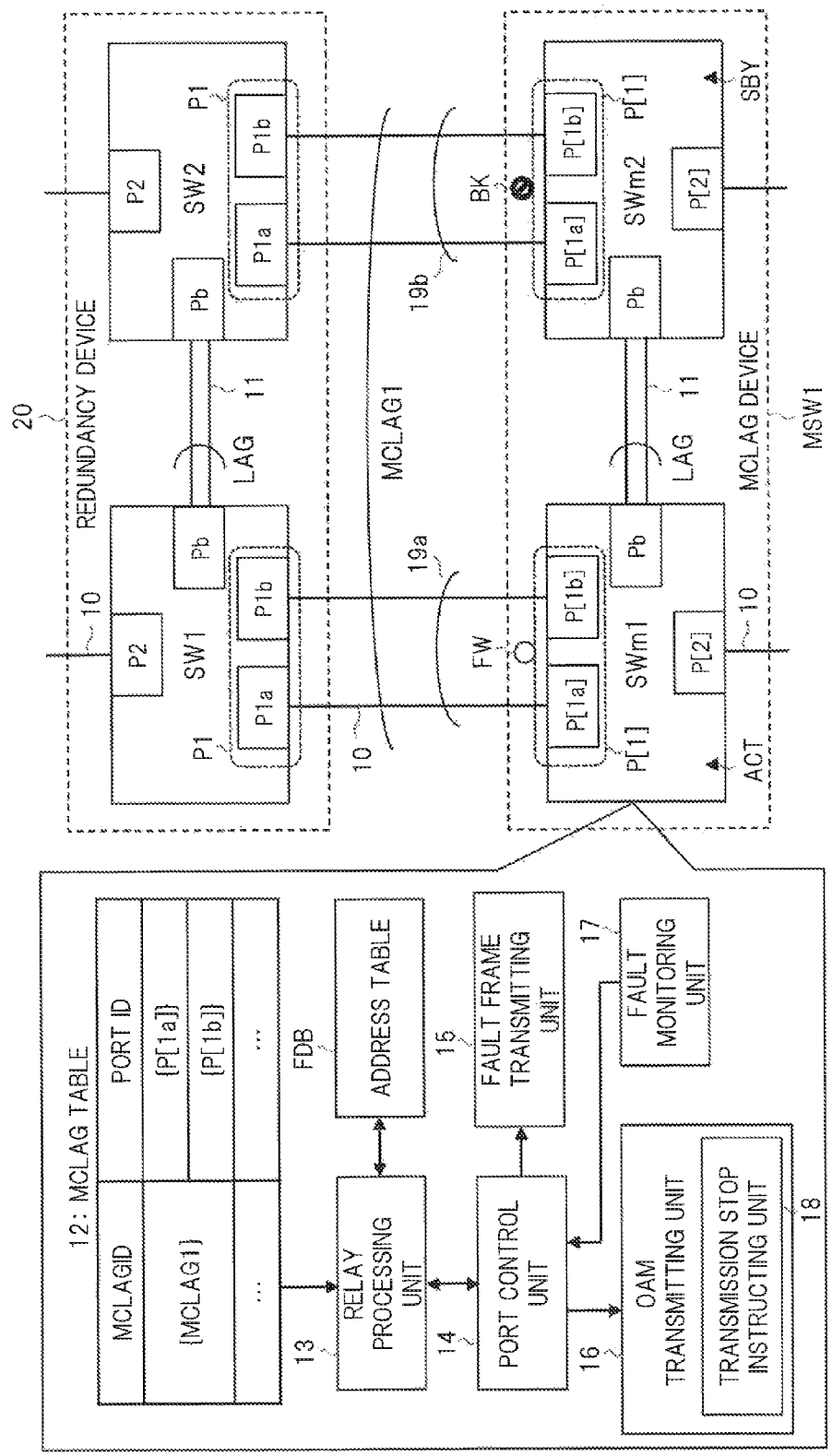
FIG. 1 is a schematic diagram of a configuration example of a relay system according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

<<General Configuration of Relay System>>

FIG. 1 is a schematic diagram of a configuration example of a relay system according to the first embodiment of the present invention. The relay system of FIG. 1 includes a MCLAG device (first redundancy device) MSW1 to which an inter-device LAG is applied and a redundancy device (second redundancy device) 20 to which an inter-device LAG is applied and which is connected to the MCLAG device MSW1. The MCLAG device MSW1 is made up of two L2 switching devices (first and second switching devices) SWm1 and SWm2 and the redundancy device 20 is also made up of two L2 switching devices (third and fourth switching devices) SW1 and SW2.

Each of the L2 switching devices SWm1 and SWm2 constituting the MCLAG device MSW1 has a MCLAG port group (first port group) P[1], a port (second port) P[2] and a bridge port Pb. The MCLAG port group P[1] is made up of one or a plurality of (in this case, two) MCLAG ports (first ports) P[1a] and P[1b]. The L2 switching device (first switching device) SWm1 and the L2 switching device (second switching device) SWm2 are connected by a communication line 11 via the bridge ports Pb.

Though not particularly limited, the bridge ports Pb are connected by two communication lines 11. Each of the L2 switching devices SWm1 and SWm2 sets LAG on the bridge ports Pb serving as connection sources of the two communication lines 11 (though not shown, two bridge ports Pb are present in practice). The communication line 11 is provided as, for example, a dedicated line or sometimes provided as an ordinary communication line (for example, Ethernet (registered trademark) line).

Though not particularly limited, the ports P[2] of the L2 switching devices SWm1 and SWm2 are ring network ports, MCLAG port groups or normal ports. When the ports P[2] are the ring network ports, the L2 switching devices SWm1 and SWm2 are constituent elements of the ring network. When the ports P[2] are the MCLAG port groups, each of the ports P[2] of the L2 switching devices SWm1 and SWm2 is made up of one or a plurality of MCLAG ports and is commonly connected to another L2 switching device or another redundancy device. When the ports P[2] are the normal ports, the ports P[2] of the L2 switching devices SWm1 and SWm2 are individually connected to different L2 switching devices, terminals and others.

Each of the L2 switching devices SW1 and SW2 constituting the redundancy device 20 has a port group P1, a port P2 and a bridge port Pb. The port group P1 is made up of one or a plurality of (in this case, two) ports P1a and P1b. The L2 switching device (third switching device) SW1 and the L2 switching device (fourth switching device) SW2 are connected by the communication line 11 via the bridge ports Pb. Though not particularly limited, different L2 switching devices, terminals and others are individually connected to the ports P2 of the L2 switching devices SW1 and SW2.

Here, the L2 switching device (third switching device) SW1 has a link (first link) 19a with the MCLAG port group P[1] of the L2 switching device (first switching device) SWm1 and has no link with the L2 switching device (second switching device) SWm2. A link means a direct communication path between devices (namely, communication path with no other device interposed therein) and is formed of a communication line and ports at both ends serving as connection sources thereof in practice. In the example of FIG. 1, the link 19a is formed of the port group P1 (ports P1a and P1b) of the L2 switching device SW1, the MCLAG port group P[1] (MCLAG ports P[1a] and P[1b]) of the L2 switching device SWm1 and two communication lines 10 connecting these ports.

On the other hand, the L2 switching device (fourth switching device) SW2 has a link (second link) 19b with the MCLAG port group P[1] of the L2 switching device (second switching device) SWm2 and has no link with the L2 switching device (first switching device) SWm1. In the example of FIG. 1, the link 19b is formed of the port group P1 (ports P1a and P1b) of the L2 switching device SW2, the MCLAG port group P[1] (MCLAG ports P[1a] and P[1b]) of the L2 switching device SWm2 and two communication lines 10 connecting these ports. The communication line 10 is made up of, for example, an Ethernet line or the like.

The MCLAG device MSW1 sets an inter-device LAG on the MCLAG port groups P[1] of the L2 switching devices SWm1 and SWm2. Similarly, the redundancy device 20 also sets an inter-device LAG on the port groups P1 of the L2 switching devices SW1 and SW2. The LAG is generally applied within one device without extending across devices, but in this case, the LAG is set across devices. In this specification, therefore, such an inter-device LAG is distinguished from an ordinary LAG and is referred to as multi-chassis link aggregation group (hereinafter, abbreviated as MCLAG).

The MCLAG device MSW1 sets MCLAG1 on the MCLAG port groups P[1] (MCLAG ports P[1a] and P[1b]) of the L2 switching devices SWm1 and SWm2. Similarly, the redundancy device 20 also sets MCLAG1 on the port groups P1 (ports P1a and P1b) of the L2 switching devices SW1 and SW2. Also, both of the MCLAG device (first redundancy device) MSW1 and the redundancy device (second redundancy device) 20 are redundancy devices made up of two L2 switching devices, but in the first embodiment, the redundancy device 20 shall be realized by the generally known configuration unlike the MCLAG device MSW1.

Specifically, the redundancy device 20 is required only to have a function of reducing the communication carried out at a port where a fault occurs to the rest of ports having no fault when a fault occurs at any of the four ports (P1a and P1b of SW1 and P1a and P1b of SW2) provided in each of the L2 switching devices SW1 and SW2. As an example thereof, the redundancy device 20 of FIG. 1 has a function of setting an inter-device LAG (MCLAG) on the four ports. Furthermore, though details thereof will be described later, the redundancy device 20 also has a function of the Ethernet OAM (Operations, Administration and Maintenance) separately.

As described above, it is beneficial to use a redundancy device having a function of setting an inter-device LAG (MCLAG) also in the redundancy device 20 because it becomes unnecessary to perform the flushing of the FDB (Forwarding DataBase) and others when a fault occurs. More specifically, since the redundancy device 20 like this generally manages the ports on which the inter-device LAG (MCLAG) is set as virtually one port on the FDB, it is not necessary to change the information of destination port in the FDB even when a fault occurs at a part of the member ports of the MCLAG.

Each of the L2 switching devices (first and second switching devices) SWm1 and SWm2 constituting the MCLAG device MSW1 has a MCLAG table 12, a relay processing unit 13, an address table FDB, a port control unit 14, a fault frame transmitting unit 15, an OAM transmitting unit 16 and a fault monitoring unit 17. The OAM transmitting unit 16 has a transmission stop instructing unit 18.

The MCLAG table 12 retains a plurality of MCLAG ports (actually, port identifiers thereof) of its own switching device in association with a MCLAG identifier. In the example of FIG. 1, the MCLAG table 12 retains the plurality of MCLAG ports (first ports) P[1a] and P[1b] (port identifiers {P[1a]} and {P[1b]} thereof) in association with the MCLAG identifier (first identifier) {MCLAG1}. In this specification, for example, {AA} represents an identifier (ID) for "AA".

For example, it is determined in advance that the MCLAG identifier {MCLAG1} is commonly used in the MCLAG device MSW1. Each of the L2 switching devices SWm1 and SWm2 constituting the MCLAG device MSW1 determines port identifiers {P[1a]} and {P[1b]} of its own MCLAG ports to be assigned to a MCLAG identifier {MCLAG1} based on its own MCLAG table 12.

The fault monitoring unit 17 monitors presence and absence of fault at the MCLAG port group P[1] of its own switching device. Specifically, the fault monitoring unit 17 monitors presence and absence of fault by hardware such as a detection circuit of a signal intensity of a received signal and a detection circuit of a pulse signal such as FLP (Fast Link Pulse). Also, the fault monitoring unit 17 monitors presence and absence of fault by using the function of Ethernet OAM described later in addition to or in place of the hardware.

In the present embodiment, as a matter of convenience, the fault monitoring unit 17 determines that the MCLAG port group P[1] has no fault when both of the two MCLAG ports P[1a] and P[1b] constituting the MCLAG port group P[1] have no fault, and determines that the MCLAG port group P[1] has a fault in the other cases. However, the criterion for determining the presence and absence of fault at the MCLAG port group is not limited to this, and the criterion can be changed as needed. For example, the MCLAG port group is determined to have a fault when both of the two MCLAG ports have faults and is determined to have no fault in the other cases.

The fault frame transmitting unit 15 transmits a fault notification frame via the bridge port Pb when a monitoring result by the fault monitoring unit 17 is changed from absence of fault to presence of fault. Also, the fault frame transmitting unit 15 transmits a fault recovery frame via the bridge port Pb when the monitoring result by the fault monitoring unit 17 is changed from the presence of fault to the absence of fault.

The port control unit 14 generally controls the MCLAG port group (first port group) P[1] to a transmission/reception permitted state (first state) FW or a transmission/reception prohibited state (second state) BK in accordance with whether the MCLAG port group P[1] is set to active ACT or standby SBY. The transmission/reception permitted state FW is a state in which frame transmission and reception are both permitted, and the transmission/reception prohibited state BK is a state in which frame transmission and reception are both prohibited. Specifically, the port control unit 14 performs the following processes (1) and (2).

(1) When the MCLAG port group (first port group) P[1] is set to active ACT (first case) and the monitoring result by the fault monitoring unit 17 is the absence of fault, the port control unit 14 controls the MCLAG port group P[1] to the transmission/reception permitted state FW. On the other hand, in the first case and when the monitoring result by the fault monitoring unit 17 is the presence of fault, the port control unit 14 controls the MCLAG port group P[1] to the transmission/reception prohibited state BK.

(2) When the MCLAG port group (first port group) P[1] is set to standby SBY (second case) and the fault notification frame is not received through the bridge port Pb, the port control unit 14 controls the MCLAG port group P[1] to the transmission/reception prohibited state BK. On the other hand, in the second case and when the fault notification frame is received through the bridge port Pb and the monitoring result by the fault monitoring unit 17 is the absence of fault, the port control unit 14 controls the MCLAG port group P[1] to the transmission/reception permitted state FW.

Note that the transmission/reception permitted state FW and the transmission/reception prohibited state BK are intended for the user frame serving as a normal frame and are not intended for the control frame for managing and controlling the device typified by the fault notification frame and fault recovery frame described above and the frame based on the Ethernet OAM.

Here, as shown in FIG. 1, in the present embodiment, one of the two L2 switching devices SWm1 and SWm2 constituting the MCLAG device MSW1 (SWm1 in this case) is set to active ACT in units of device in advance and the other (SWm2 in this case) is set to standby SBY in units of device in advance. The L2 switching device SWm1 set to active ACT sets its own MCLAG port group P[1] to active ACT and the L2 switching device SWm2 set to standby SBY sets its own MCLAG port group P[1] to standby SBY.

In FIG. 1, on the assumption of the case of no fault, since the MCLAG port group P[1] of the L2 switching device SWm1 is set to active ACT, the port control unit 14 of the L2 switching device SWm1 controls the MCLAG port group P[1] to the transmission/reception permitted state FW. Meanwhile, since the MCLAG port group P[1] of the L2 switching device SWm2 is set to standby SBY, the port control unit 14 of the L2 switching device SWm2 controls the MCLAG port group P[1] to the transmission/reception prohibited state BK.

Note that the setting method to active ACT or standby SBY is not necessarily the setting method in units of device, but may be a setting method in units of MCLAG port group. For example, when the ports P[2] of the L2 switching devices SWm1 and SWm2 are also the MCLAG port groups, one of the MCLAG port groups P[1] is set to active ACT and the other is set to standby SBY, and one of the MCLAG port groups P[2] is set to active ACT and the other is set to standby SBY.

When the MCLAG port group (first port group) P[1] of its own switching device is controlled to the transmission/reception permitted state FW, the relay processing unit 13 relays a frame containing a MCLAG identifier (first identifier) {MCLAG1} thereof as a destination port to the MCLAG port group P[1]]. Meanwhile, when the MCLAG port group (first port group) P[1] of its own switching device is controlled to the transmission/reception prohibited state BK, the relay processing unit 13 relays a frame containing a MCLAG identifier (first identifier) {MCLAG1} thereof as a destination port to the bridge port Pb.

In this case, the frame destination port is determined based on the retrieval result on the address table FDB. It is widely known that the address table FDB retains the correspondence relation between a port and a MAC (Media Access Control) address present ahead of the port. The relay processing unit 13 carries out, for example, the following process for the address table FDB.

First, when a port having received a frame is the MCLAG port group P[1] (that is, MCLAG ports P[1a] and P[1b]) of its own switching device, the relay processing unit 13 determines the MCLAG identifier {MCLAG1} of the MCLAG port group to be a reception port identifier. The relay processing unit 13 then learns a source MAC address contained in the frame in association with the reception port identifier to the address table FDB. Also, the relay processing unit 13 retrieves the destination port corresponding to the destination MAC address contained in the frame from the address table FDB.

When the frame received at the MCLAG port group is relayed to the bridge port Pb based on the retrieval result of the address table FDB or the like, the relay processing unit 13 relays the frame, to which the reception port identifier is added, to the bridge port Pb. The case in which the frame is relayed to the bridge port Pb corresponds to the case in which the bridge port Pb is acquired as a destination port or the case in which the MCLAG identifier is acquired as a destination port and the MCLAG port group of its own switching device corresponding to the MCLAG identifier is controlled to the transmission/reception prohibited state BK. When the frame to which a reception port identifier is added is received at the bridge port Pb, the relay processing unit 13 learns a source MAC address contained in the frame in association with the reception port identifier added to the frame to the address table FDB.

The OAM transmitting unit 16 transmits a control frame based on the Ethernet OAM. The Ethernet OAM has been standardized by "ITU-T Y.1731" and "IEEE802.1ag", etc. as the maintenance and management function. In the Ethernet OAM, a function referred to as CC (Continuity Check) is defined as one of its functions. This is a function of monitoring continuity between monitoring points called MEP (Maintenance End Point) by transmitting and receiving a control frame called CCM (Continuity Check Message) (hereinafter, referred to as CCM control frame) between the monitoring points.

For example, the L2 switching device SWm1 and the L2 switching device SW1 both set the MCLAG port P[1a] of the L2 switching device SWm1 and the port P1a of the L2 switching device SW1 as MEP (defined as MEP1a), and transmit and receive the CCM control frame between the MEP1a at regular intervals. Similarly, the L2 switching device SWm1 and the L2 switching device SW1 both set the MCLAG port P[1b] and the port P1b as MEP1b, and transmit and receive the CCM control frame between the MEP1b at regular intervals.

Here, for example, when the L2 switching device SWm1 cannot receive the CCM control frame at the MCLAG port P[1a] from the port P1a of the L2 switching device SW1 within a predetermined period, the L2 switching device SWm1 (the fault monitoring unit 17 thereof) determines that the continuity with respect to the port P1a is in a LOC (Loss Of Continuity) state. In this case, the L2 switching device SWm1 transmits the CCM control frame having a flag attached to a RDI (Remote Defect Indication) bit when transmitting the CCM control frame from the MCLAG port P[1a] to the port P1a of the L2 switching device SW1.

In this specification, the CCM control frame having no flag attached to the RDI bit is simply referred to as CCM frame (abbreviated as CCM), and the CCM control frame having a flag attached to the RDI bit is referred to as RDI frame (abbreviated as RDI). Upon reception of the RDI at the port P1a, the L2 switching device SW1 recognizes that a fault is present in a transmission path from the port P1a, and stops the transmission of the frame (user frame) from the port P1a until the RDI is canceled (namely, until being able to receive the CCM).

By using the mechanism of the Ethernet OAM like this, the OAM transmitting unit 16 performs the operation in conformity to the standard of the Ethernet OAM and further performs the operation different from the standard of the Ethernet OAM by using the transmission stop instructing unit 18, thereby instructing the redundancy device 20 to stop the transmission of the user frame. Specifically, the OAM transmitting unit 16 (transmission stop instructing unit 18) transmits the RDI even when the CCM control frame is received at the port from each of one or a plurality of MCLAG ports (first ports) P[1a] and P[1b] constituting the MCLAG port group (first port group) P[1] controlled to the transmission/reception prohibited state BK.

<<General Operation of Relay System (in the Absence of Fault)>>

Figure 2:
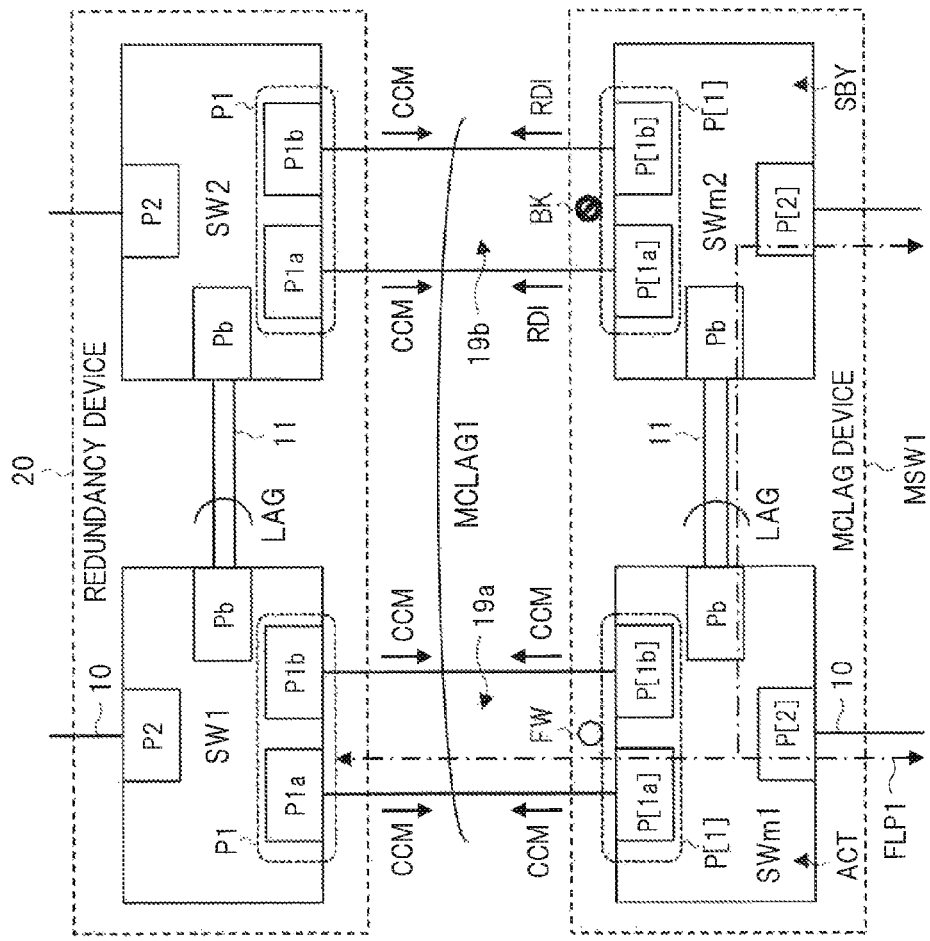
FIG. 2 is an explanatory diagram schematically showing an operation example in the absence of fault in the relay system of FIG. 1.

FIG. 2 is an explanatory diagram schematically showing an operation example in the absence of fault in the relay system of FIG. 1. In the L2 switching device SWm1, the MCLAG port group P[1] is set to active ACT and the monitoring result of the port group by the fault monitoring unit 17 is the absence of fault. Therefore, the port control unit 14 of the L2 switching device SWm1 controls the MCLAG port group P[1] to the transmission/reception permitted state FW. On the other hand, in the L2 switching device SWm2, the MCLAG port group P[1] is set to standby SBY, the monitoring result of the port group by the fault monitoring unit 17 is the absence of fault, and the bridge port Pb does not receive the fault notification frame. Therefore, the port control unit 14 of the L2 switching device SWm2 controls the MCLAG port group P[1] to the transmission/reception prohibited state BK.

The OAM transmitting unit 16 of the L2 switching device SWm1 transmits the CCM control frame in conformity to the standard of the Ethernet OAM from the MCLAG port group P[1] controlled to the transmission/reception permitted state FW. Namely, since the CCM is received at regular intervals at each of the MCLAG ports P[1a] and P[1b], the OAM transmitting unit 16 transmits the CCM at regular intervals from each of the MCLAG ports P[1a] and P[1b]. Similarly, since the CCM is received at regular intervals at each of the ports P1a and P1b, the L2 switching device SW1 also transmits the CCM at regular intervals from each of the ports P1a and P1b.

On the other hand, the OAM transmitting unit 16 of the L2 switching device SWm2 (specifically, transmission stop instructing unit 18) transmits the RDI from the MCLAG port group P[1] controlled to the transmission/reception prohibited state BK unlike the standard of the Ethernet OAM. Namely, although the OAM transmitting unit 16 (transmission stop instructing unit 18) receives the CCM at each of the MCLAG ports P[1a] and P[1b], the OAM transmitting unit 16 (transmission stop instructing unit 18) transmits the RDI at regular intervals from each of the MCLAG ports P[1a] and P[1b]. Since the L2 switching device SW2 receives the RDI at each of the ports P1a and P1b, it transmits the CCM from each of the ports P1a and P1b.

When transmitting a frame to the MCLAG1, the redundancy device 20 takes the member ports of the MCLAG1 (P1a and P1b of SW1 and P1a and P1b of SW2) as candidates of transmission port, and selects one port from the candidates. At this time, the redundancy device 20 eliminates the port receiving the RDI (P1a and P1b of SW2) from the candidates of the transmission port.

As a result, a communication path FLP1 of the frame (user frame) shown in FIG. 2 is formed between the MCLAG device MSW1 and the redundancy device 20.

First, the case in which the MCLAG device MSW1 transmits the frame to the redundancy device 20 is assumed. As an example thereof, the case in which the L2 switching device SWm1 receives a frame at the port P[2] is assumed. The L2 switching device SWm1 learns a source MAC address of the frame in association with the port identifier {P[2]} serving as a reception port identifier to the address table FDB. Also, the L2 switching device SWm1 retrieves a destination port corresponding to a destination MAC address of the frame from the address table FDB. As the retrieval result of the destination port, the L2 switching device SWm1 acquires the MCLAG identifier {MCLAG1}.

Since its own MCLAG port group P[1] corresponding to the MCLAG identifier {MCLAG1} is controlled to the transmission/reception permitted state FW, the L2 switching device SWm1 relays the frame to the MCLAG port group P[1]. Specifically, the L2 switching device SWm1 selects one MCLAG port from the MCLAG ports P[1a] and P[1b] based on a predetermined distribution rule, and relays the frame to the selected MCLAG port (for example, P[1a]). The redundancy device 20 relays the frame received at a predetermined port (for example, P1a of SW1) to the port acquired from the retrieval result of its own address table.

Also, as another example, the case in which the L2 switching device SWm2 receives a frame at the port P[2] is assumed. The L2 switching device SWm2 learns the source MAC address of the frame in association with the port identifier {P[2]} serving as a reception port identifier to the address table FDB. Also, the L2 switching device SWm2 retrieves a destination port corresponding to a destination MAC address of the frame from the address table FDB. As the retrieval result of the destination port, the L2 switching device SWm2 acquires the MCLAG identifier {MCLAG1}.

Since its own MCLAG port group P[1] corresponding to the MCLAG identifier {MCLAG1} is controlled to the transmission/reception prohibited state BK, the L2 switching device SWm2 relays the frame to the bridge port Pb. The L2 switching device SWm1 receives the frame at the bridge port Pb and learns the source MAC address thereof in association with the port identifier {Pb} serving as a reception port identifier to the address table FDB. Also, the L2 switching device SWm1 retrieves a destination port corresponding to a destination MAC address of the frame from the address table FDB. As the retrieval result of the destination port, the L2 switching device SWm1 acquires the MCLAG identifier {MCLAG1}.

Since its own MCLAG port group P[1] corresponding to the MCLAG identifier {MCLAG1} is controlled to the transmission/reception permitted state FW, the L2 switching device SWm1 selects one MCLAG port based on a predetermined distribution rule and relays the frame to the selected MCLAG port (for example, P[1b]). The redundancy device 20 relays the frame received at a predetermined port (for example, P1b of SW1) to the port acquired from the retrieval result of its own address table.

Next, the case in which the redundancy device 20 transmits a frame to the MCLAG device MSW1 is assumed. As described above, the redundancy device 20 eliminates the ports P1a and P1b of the L2 switching device SW2 from the candidates of the transmission port. Therefore, the redundancy device 20 selects one port from the ports P1a and P1b of the L2 switching device SW1 based on a predetermined distribution rule, and relays the frame to the selected port (for example, P1a).

The L2 switching device SWm1 receives the frame at a predetermined MCLAG port (for example, P[1a]) and learns the source MAC address thereof in association with the MCLAG identifier {MCLAG1} serving as a reception port identifier to the address table FDB. Also, the L2 switching device SWm1 retrieves a destination port corresponding to a destination MAC address of the frame from the address table FDB. Here, when the terminal corresponding to the destination MAC address is present ahead of the port P[2] of the L2 switching device SWm1, the port identifier {P[2]} is acquired as the destination port, and when it is present ahead of the port P[2] of the L2 switching device SWm2, the port identifier {Pb} is acquired as the destination port.

When the port identifier {P[2]} is acquired as the destination port, the L2 switching device SWm1 relays the frame to the port P[2]. Meanwhile, when the port identifier {Pb} is acquired as the destination port, the L2 switching device SWm1 adds the reception port identifier {MCLAG1} to the frame and then relays the frame to the bridge port Pb. The L2 switching device SWm2 receives the frame, to which the reception port identifier {MCLAG1} is added, at the bridge port Pb, and learns the source MAC address thereof in association with the reception port identifier {MCLAG1} to the address table FDB. Also, the L2 switching device SWm2 retrieves the destination port corresponding to the destination MAC address of the frame from the address table FDB and relays the frame to the port P[2] acquired from the retrieval result.

<<General Operation of Relay System (in the Occurrence of Fault at MCLAG Port Group)>>

Figure 3:
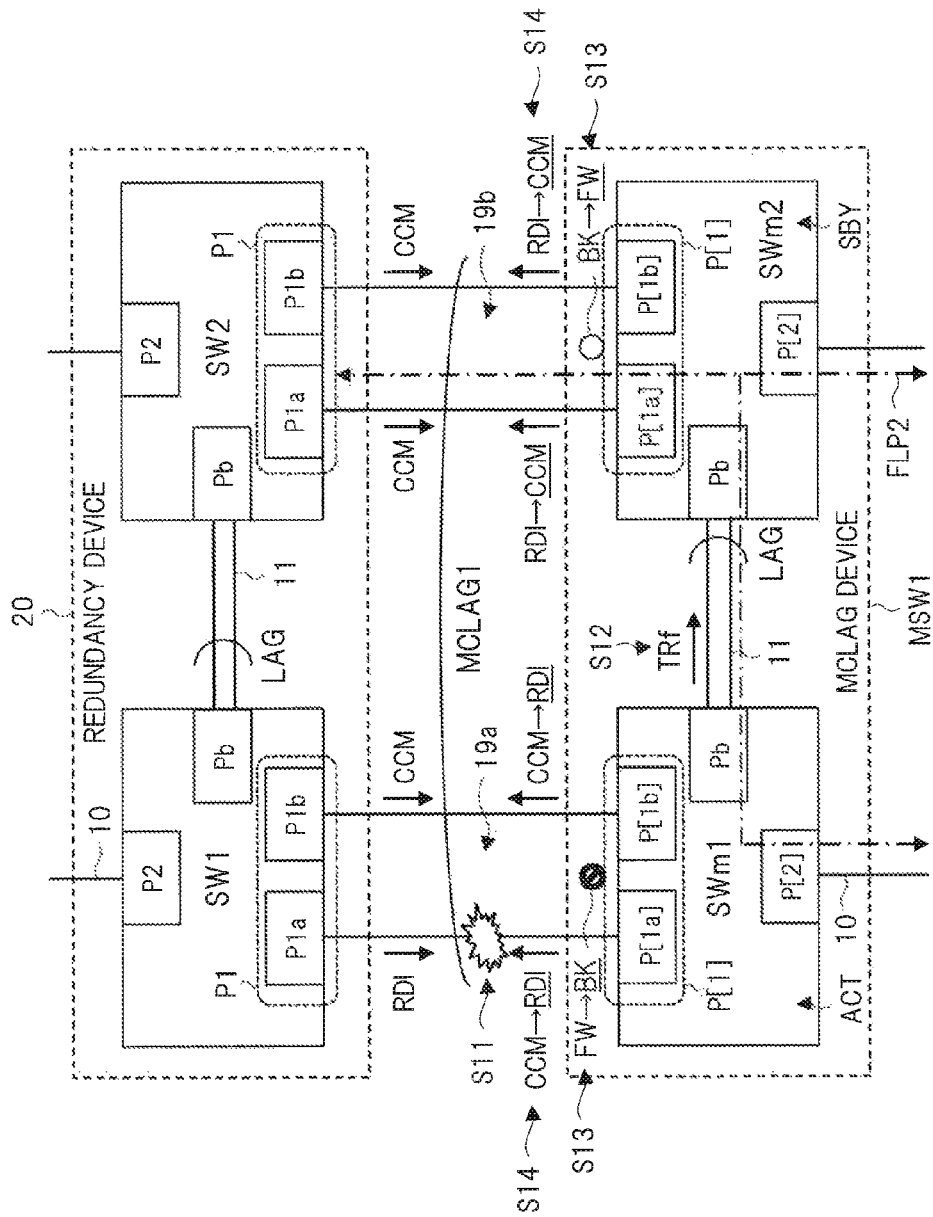
FIG. 3 is an explanatory diagram schematically showing an operation example in the case of occurrence of a fault at a MCLAG port group in the relay system of FIG. 1.

FIG. 3 is an explanatory diagram schematically showing an operation example in the case in which a fault occurs at a MCLAG port group in the relay system of FIG. 1. Here, the case in which a fault occurs on the communication line 10 connected to the MCLAG port P[1a] of the L2 switching device SWm1 in the state of the absence of fault shown in FIG. 2 is taken as an example.

The fault monitoring unit 17 of the L2 switching device SWm1 detects a fault occurrence at the MCLAG port P[1a] and thus determines that the MCLAG port group P[1] has a fault (step S11). Specifically, the fault monitoring unit 17 detects the fault occurrence at the MCLAG port P[1a] based on the detection result by various hardware described with reference to FIG. 1 or the reception state of the CCM control frame. In the latter case, for example, the fault monitoring unit 17 detects the fault occurrence at the MCLAG port P[1a] when the CCM control frame cannot be received at the MCLAG port P[1a] within a predetermined period or when the RDI is received at the MCLAG port P[1a].

Since the monitoring result by the fault monitoring unit 17 is changed from absence of fault to presence of fault, the fault frame transmitting unit 15 of the L2 switching device SWm1 transmits the fault notification frame TRf via the bridge port Pb (step S12). The fault notification frame TRf contains information of the place of fault occurrence (for example, MCLAG identifier {MCLAG1}). Also, since the monitoring result of the MCLAG port group P[1] by the fault monitoring unit 17 is changed to the presence of fault, the port control unit 14 of the L2 switching device SWm1 controls the MCLAG port group P[1] to the transmission/reception prohibited state Bk instead of the transmission/reception permitted state FW (step S13).

The L2 switching device SWm2 receives the fault notification frame TRf in the state where the monitoring result of its own MCLAG port group P[1] by the fault monitoring unit 17 is the absence of fault. Therefore, the port control unit 14 of the L2 switching device SWm2 controls its own MCLAG port group P[1] corresponding to the place of fault occurrence of the fault notification frame TRf to the transmission/reception permitted state FW instead of the transmission/reception prohibited state BK (step S13).

Since the MCLAG port group P[1] is controlled to the transmission/reception permitted state FW, the OAM transmitting unit 16 of the L2 switching device SWm2 transmits the CCM instead of the RDI at regular intervals from each of the MCLAG ports P[1a] and P[1b] (step S14). Since the L2 switching device SW2 receives the CCM at regular intervals at each of the ports P1a and P1b, it transmits the CCM at regular intervals from each of the ports P1a and P1b.

On the other hand, since the MCLAG port group P[1] is controlled to the transmission/reception prohibited state BK, the OAM transmitting unit 16 (specifically, transmission stop instructing unit 18) of the L2 switching device SWm1 transmits the RDI at regular intervals from each of the MCLAG ports P[1a] and P[1b] constituting the MCLAG port group P[1]. More specifically, the transmission stop instructing unit 18 transmits the RDI instead of the CCM also from the MCLAG port P[1b], in which no fault occurrence is detected, in addition to the MCLAG port P[1a] in which the fault occurrence is detected (step S14).

When the L2 switching device SW1 does not receive the CCM control frame at the port P1a due to the fault, it transmits the RDI from the port P1a. Also, since the L2 switching device SW1 receives the RDI at the port P1b, it transmits the CCM from the port P1b. As a result, the redundancy device 20 adds the ports P1a and P1b of the L2 switching device SW2 to the candidates of the transmission port in the MCLAG1 and eliminates the ports P1a and P1b of the L2 switching device SW1 from the candidates of the transmission port from the state of FIG. 2.

As a result, a communication path FLP2 of a frame (user frame) is formed between the MCLAG device MSW1 and the redundancy device 20 as shown in FIG. 3. Since processes such as the learning and the retrieval on the address table FDB are performed in the same manner as those in the example of FIG. 2, they will be briefly described below.

First, the case in which the MCLAG device MSW1 transmits a frame to the redundancy device 20 is assumed. As an example thereof, the case in which the L2 switching device SWm1 receives a frame at the port P[2] is assumed. The L2 switching device SWm1 learns a source MAC address of the frame in association with the port identifier {P[2]} to the address table FDB, and retrieves a destination port corresponding to a destination MAC address from the address table FDB. As the retrieval result of the destination port, the L2 switching device SWm1 acquires the MCLAG identifier {MCLAG1}. Since its own MCLAG port group P[1] corresponding to the MCLAG identifier {MCLAG1} is controlled to the transmission/reception prohibited state BK, the L2 switching device SWm1 relays the frame to the bridge port Pb.

The L2 switching device SWm2 learns the source MAC address of the frame received at the bridge port Pb in association with the port identifier {Pb} to the address table FDB, and retrieves a destination port corresponding to the destination MAC address from the address table FDB. As the retrieval result of the destination port, the L2 switching device SWm2 acquires the MCLAG identifier {MCLAG1}. Since its own MCLAG port group P[1] corresponding to the MCLAG identifier {MCLAG1} is controlled to the transmission/reception permitted state FW, the L2 switching device SWm2 relays the frame to one MCLAG port (for example, P[1a]) selected based on a predetermined distribution rule among the MCLAG ports. The redundancy device 20 relays the frame received at the predetermined port (for example, P1a of SW2) to the port acquired from the retrieval result of its own address table.

Also, as another example, the case in which the L2 switching device SWm2 receives a frame at the port P[2] is assumed. The L2 switching device SWm2 learns a source MAC address of the frame in association with the port identifier {P[2]} to the address table FDB, and retrieves a destination port corresponding to a destination MAC address from the address table FDB. As the retrieval result of the destination port, the L2 switching device SWm2 acquires the MCLAG identifier {MCLAG1}.

Since its own MCLAG port group P[1] corresponding to the MCLAG identifier {MCLAG1} is controlled to the transmission/reception permitted state FW, the L2 switching device SWm2 relays the frame to one MCLAG port (for example, P[1b]) selected based on a predetermined distribution rule among the MCLAG ports. The redundancy device 20 relays the frame received at the predetermined port (for example, P1b of SW2) to the port acquired from the retrieval result of its own address table.

Next, the case in which the redundancy device 20 transmits a frame to the MCLAG device MSW1 is assumed. As described above, the redundancy device 20 eliminates the ports P1a and P1b of the L2 switching device SW1 from the candidates of the transmission port. Therefore, the redundancy device 20 selects one port from the ports P1a and P1b of the L2 switching device SW2 based on a predetermined distribution rule, and relays the frame to the selected port (for example, P1a).

The L2 switching device SWm2 learns a source MAC address of the frame received at a predetermined MCLAG port (for example, P[1a]) in association with the MCLAG identifier {MCLAG1} to the address table FDB, and retrieves a destination port corresponding to a destination MAC address from the address table FDB. As a result, the L2 switching device SWm2 acquires the port identifier {P[2]} or the port identifier {Pb} as the destination port.

When the port identifier {P[2]} is acquired as the destination port, the L2 switching device SWm2 relays the frame to the port P[2]. Meanwhile, when the port identifier {Pb} is acquired as the destination port, the L2 switching device SWm2 adds the reception port identifier {MCLAG1} to the frame and then relays the frame to the bridge port Pb. The L2 switching device SWm1 learns the source MAC address of the frame received at the bridge port Pb in association with the reception port identifier {MCLAG1} added to the frame to the address table FDB. Also, the L2 switching device SWm1 retrieves the destination port corresponding to the destination MAC address of the frame from the address table FDB and relays the frame to the port P[2] acquired from the retrieval result.

<<General Operation of Relay System (in the Recovery from Fault at MCLAG Port Group)>>

Figure 4:
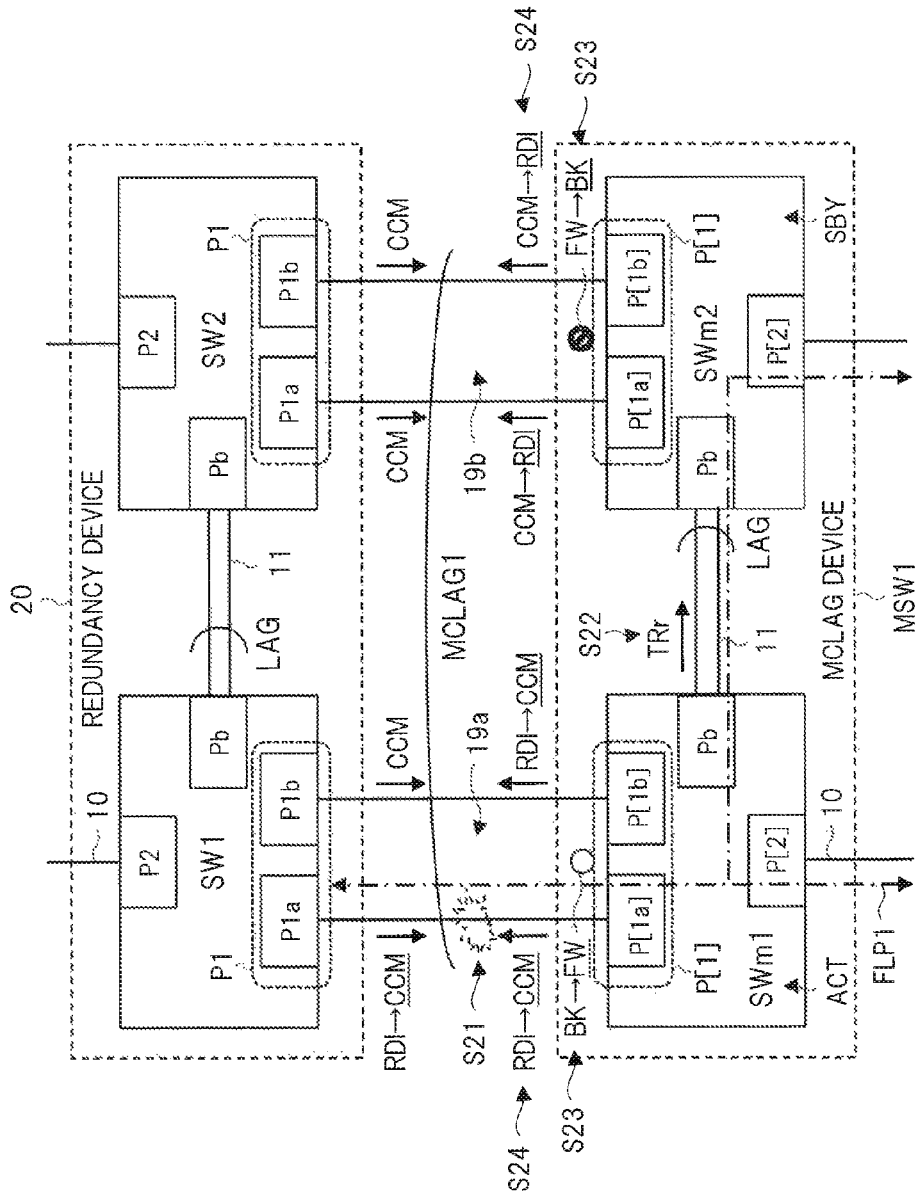
FIG. 4 is an explanatory diagram schematically showing an operation example in the case of recovery from fault at a MCLAG port group in the relay system of FIG. 1.

FIG. 4 is an explanatory diagram schematically showing an operation example in the case of recovery from fault at a MCLAG port group in the relay system of FIG. 1. Here, the case in which the fault shown in FIG. 3 is recovered is taken as an example. The fault monitoring unit 17 of the L2 switching device SWm1 detects the recovery from fault at the MCLAG port P[1a] and thus determines that the MCLAG port group P[1] has no fault (step S21). Specifically, the fault monitoring unit 17 detects the recovery from fault by the detection result of various hardware described with reference to FIG. 1 or by being able to receive the CCM at the MCLAG port P[1a].

Since the monitoring result by the fault monitoring unit 17 is changed from the presence of fault to the absence of fault, the fault frame transmitting unit 15 of the L2 switching device SWm1 transmits a fault recovery frame TRr via the bridge port Pb (step S22). The fault recovery frame TRr contains information of the place of fault recovery (for example, MCLAG identifier {MCLAG1}). Also, since the monitoring result of the MCLAG port group P[1] by the fault monitoring unit 17 is changed to the absence of fault, the port control unit 14 of the L2 switching device SWm1 controls the MCLAG port group P[1] to the transmission/reception permitted state FW instead of the transmission/reception prohibited state BK (step S23).

The L2 switching device SWm2 receives the fault recovery frame TRr. Thus, the port control unit 14 of the L2 switching device SWm2 controls the MCLAG port group P[1] of its own switching device corresponding to the place of fault recovery of the fault recovery frame TRr to the transmission/reception prohibited state BK instead of the transmission/reception permitted state FW (step S23).

Since the MCLAG port group P[1] is controlled to the transmission/reception permitted state FW, the OAM transmitting unit 16 of the L2 switching device SWm1 transmits the CCM instead of RDI at regular intervals from each of the MCLAG ports P[1a] and P[1b] (step S24). Since the L2 switching device SW1 receives the CCM at regular intervals at each of the ports P1a and P1b, it transmits the CCM at regular intervals from each of the ports P1a and P1b.

On the other hand, since the MCLAG port group P[1] is controlled to the transmission/reception prohibited state BK, the OAM transmitting unit 16 (specifically, transmission stop instructing unit 18) of the L2 switching device SWm2 transmits the RDI at regular intervals from each of the MCLAG ports P[1a] and P[1b] constituting the MCLAG port group P[1] (step S24). Since the L2 switching device SW2 receives the RDI at regular intervals at each of the ports P1a and P1b, it transmits the CCM at regular intervals from each of the ports P1a and P1b.

As a result, the redundancy device 20 adds the ports P1a and P1b of the L2 switching device SW1 to the candidates of the transmission port in the MCLAG1 and eliminates the ports P1a and P1b of the L2 switching device SW2 from the candidates of the transmission port from the state of FIG. 3. Thus, the control state of each port group becomes the same as that of FIG. 2, and the communication path FLP1 of the frame (user frame) is formed between the MCLAG device MSW1 and the redundancy device 20 as shown in FIG. 4 in the same manner as that of the case of FIG. 2.

Note that the operation example of automatically returning to the state of FIG. 2 in response to the recovery from fault has been described here, but it is also possible to employ the method capable of selecting whether to return to the state of FIG. 2. Specifically, the MCLAG device MSW1 has an automatic recovery mode and a manual recovery mode that can be selected in advance by an administrator or others. In the automatic recovery mode, the MCLAG device MSW1 automatically changes the control state of each MCLAG port group in response to the recovery from fault as shown in FIG. 4. Also, in the manual recovery mode, the MCLAG device MSW1 changes the control state of each MCLAG port group upon reception of a command input from an administrator or others. In other words, even when the fault is recovered, the MCLAG device MSW1 maintains the control state of each MCLAG port group shown in FIG. 3 until it receives a command input. For example, when the fault shown in FIG. 3 is an unstable fault, the situation in which the state of FIG. 3 and the state of FIG. 4 are alternately repeated may arise, but this situation can be prevented by selecting the manual recovery mode.

<<Main Effects of Relay System>>

(1) As shown in FIG. 2 and FIG. 3, the communication between the MCLAG device (first redundancy device) MSW1 and the redundancy device (second redundancy device) 20 is performed through the link (first link) 19a when the link 19a has no fault. When the link 19a has a fault and the link (second link) 19b has no fault, the communication is performed through the link 19b. More specifically, the communication between the redundancy devices is performed through one of the two L2 switching devices constituting each of the redundancy devices. As a result, the frame transfer path can be easily grasped and the network management can be facilitated.

Specifically, when the communication between redundancy devices is monitored by, for example, port mirroring, it is only required to monitor the link 19a on the active ACT side (namely, P[1] of SWm1 and P1 of SW1), and it becomes unnecessary to monitor the link 19b on the standby SBY side (namely, P[1] of SWm2 and P1 of SW2). Such a reduction in monitoring subjects is particularly advantageous when the number of redundancy devices to be incorporated is large like in a carrier network, etc.

(2) By proving the transmission stop instructing unit 18 using the Ethernet OAM, the redundancy device 20 can be artificially operated as if it is an active/standby redundancy device regardless of whether the redundancy device 20 is an active/standby redundancy device. More specifically, the redundancy device 20 having a function of the Ethernet OAM generally stops the transmission operation from the port which has received the RDI. By utilizing this, the MCLAG device MSW1 transmits the RDI by using the transmission stop instructing unit 18 in accordance with the control state of its own MCLAG port group, thereby controlling the port group of the redundancy device 20 in conjunction with the control state of its own MCLAG port group.

Here, as another method of artificially operating the redundancy device 20 as an active/standby redundancy device, for example, a method of transmitting and receiving a dedicated frame for synchronizing the active and standby states between the MCLAG device MSW1 and the redundancy device 20 may be employed. In this method, however, compared with the widely-used method utilizing the Ethernet OAM, a dedicated function needs to be provided in the redundancy device 20, and thus it becomes difficult to secure the general versatility of the redundancy device 20. In addition, as still another method, a method in which the MCLAG device MSW1 puts a port group in the transmission/reception prohibited state BK into a link-down state and the redundancy device 20 is made to detect it may be employed. In this method, however, in the path switching operation in the occurrence of fault, it takes time to put a port group, which is in a link-down state (for example, stop of output of optical signals), into a link-up state. From this viewpoint, the method using the Ethernet OAM is more desirable.

Note that the Patent Documents 1 to 3 mentioned above do not take account of the connection between redundancy devices like the present embodiment. Also, in the technique of the Patent Document 1, network devices are both used in an active state for a data plane, and there is no distinction between active and standby for MCLAG port groups like the present embodiment. Also, the technique of the Patent Document 2 is the technique of controlling the path by defining the actions relative to the combinations of a source address and a destination address based on the MPLS network, and it is essentially different from the system of the present embodiment. Furthermore, the technique of the Patent Document 3 does not use the LAG. In this case, as described above, there is a threat that the flushing of the FDB needs to be performed when a fault occurs.

Second Embodiment

<<General Configuration of Relay System (Modification Example)>>

Figure 5:
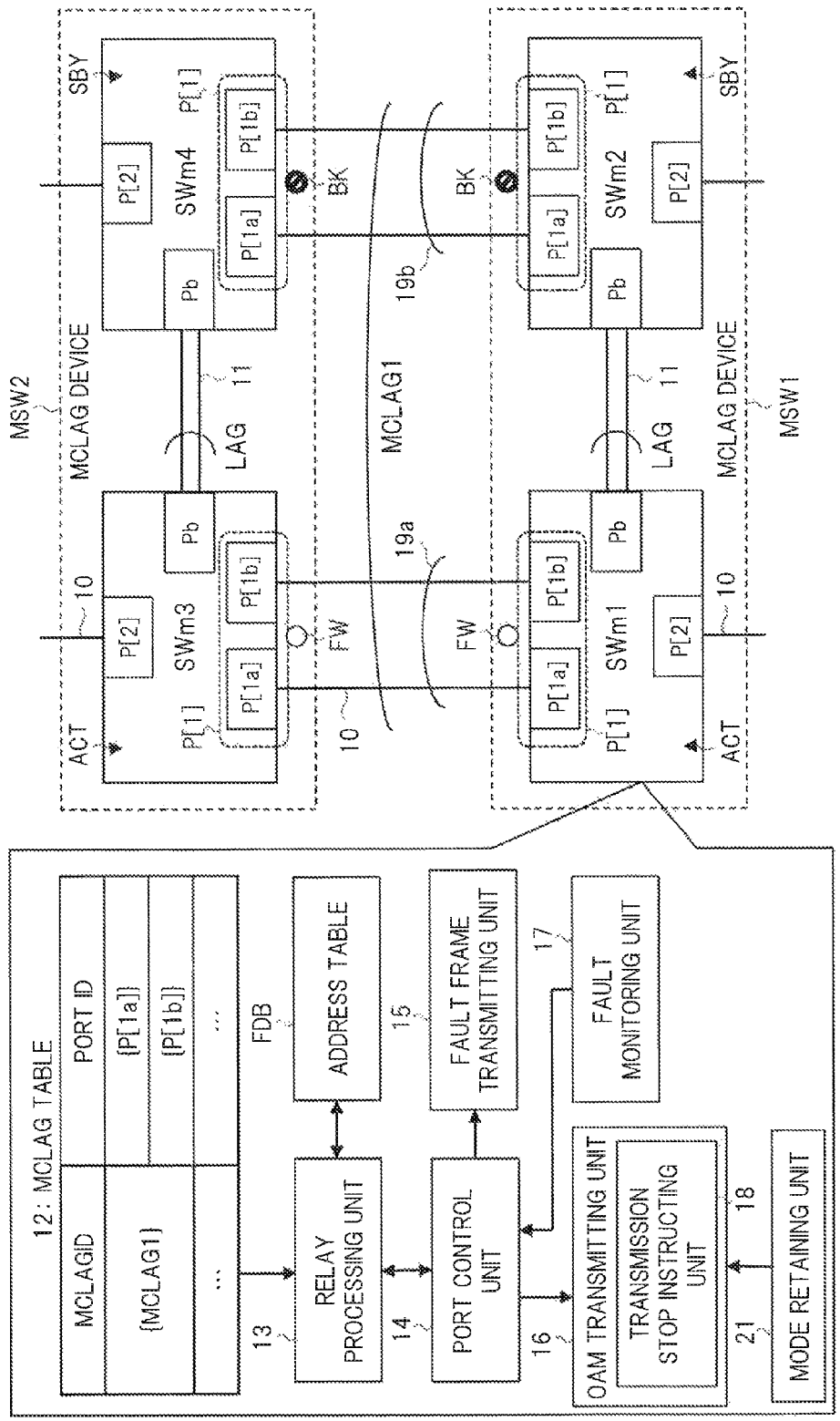
FIG. 5 is a schematic diagram of a configuration example of a relay system according to the second embodiment of the present invention.

FIG. 5 is a schematic diagram of a configuration example of a relay system according to the second embodiment of the present invention. The relay system shown in FIG. 5 is different from the relay system shown in FIG. 1 in that a MCLAG device MSW2 having the same configuration as that of the MCLAG device MSW1 is provided as the redundancy device 20 of FIG. 1. The MCLAG device MSW2 is made up of two L2 switching devices (third and fourth switching devices) SWm3 and SWm4.

Each of the L2 switching devices SWm3 and SWm4 constituting the MCLAG device MSW2 has a MCLAG port group P[1], a port P[2] and a bridge port Pb like the L2 switching devices SWm1 and SWm2. The MCLAG port group P[1] is made up of one or a plurality of (in this case, two) MCLAG ports P[1a] and P[1b]. The L2 switching device (third switching device) SWm3 and the L2 switching device (fourth switching device) SWm4 are connected by a communication line 11 via the bridge ports Pb.

The L2 switching device (third switching device) SWm3 has a link (first link) 19a with the MCLAG port group P[1] of the L2 switching device (first switching device) SWm1 and has no link with the L2 switching device (second switching device) SWm2. In the example of FIG. 5, the link 19a is formed of the MCLAG port groups P[1] (MCLAG ports P[1a] and P[1b]) of the L2 switching devices SWm1 and SWm3 and two communication lines 10 connecting the MCLAG port groups (MCLAG ports thereof).

On the other hand, the L2 switching device (fourth switching device) SWm4 has a link (second link) 19b with the MCLAG port group P[1] of the L2 switching device (second switching device) SWm2 and has no link with the L2 switching device (first switching device) SWm1. In the example of FIG. 5, the link 19b is formed of the MCLAG port groups P[1] (MCLAG ports P[1a] and P[1b]) of the L2 switching devices SWm2 and SWm4 and two communication lines 10 connecting the MCLAG port groups (MCLAG ports thereof).

The MCLAG device MSW1 sets MCLAG1 on the MCLAG port groups P[1] of the L2 switching devices SWm1 and SWm2, and the MCLAG device MSW2 also sets MCLAG1 on the MCLAG port groups P[1] of the L2 switching devices SWm3 and SWm4. Also, the L2 switching device SWm3 of the MCLAG device MSW2 is set to active ACT like the L2 switching device SWm1 of the MCLAG device MSW1 opposed thereto. The L2 switching device SWm4 of the MCLAG device MSW2 is also set to standby SBY like the L2 switching device SWm2 of the MCLAG device MSW1 opposed thereto.

Each of the L2 switching devices SWm1 to SWm4 has a mode retaining unit 21 in addition to the MCLAG table 12, the relay processing unit 13, the address table FDB, the port control unit 14, the fault frame transmitting unit 15, the OAM transmitting unit 16 and the fault monitoring unit 17 shown in FIG. 1. The mode retaining unit 21 retains an active mode (first mode) in which the OAM transmitting unit 16 is operated while activating the transmission stop instructing unit 18 and an inactive mode (second mode) in which the OAM transmitting unit 16 is operated while inactivating the transmission stop instructing unit 18.

When the active mode (first mode) is retained, the OAM transmitting unit 16 transmits the RDI from each of one or a plurality of MCLAG ports (first ports) P[1a] and P[1b] constituting the MCLAG port group (first port group) P[1] controlled to the transmission/reception prohibited state (second state) BK like the case of the first embodiment. On the other hand, when the inactive mode (second mode) is retained, the OAM transmitting unit 16 transmits the CCM control frame in conformity to the standard of the Ethernet OAM from each of one or a plurality of MCLAG ports P[1a] and P[1b] constituting the MCLAG port group P[1] controlled to the transmission/reception prohibited state BK unlike the case of the first embodiment.

<<Problem to be Premise of Relay System (Modification Example)>>

Figure 9:
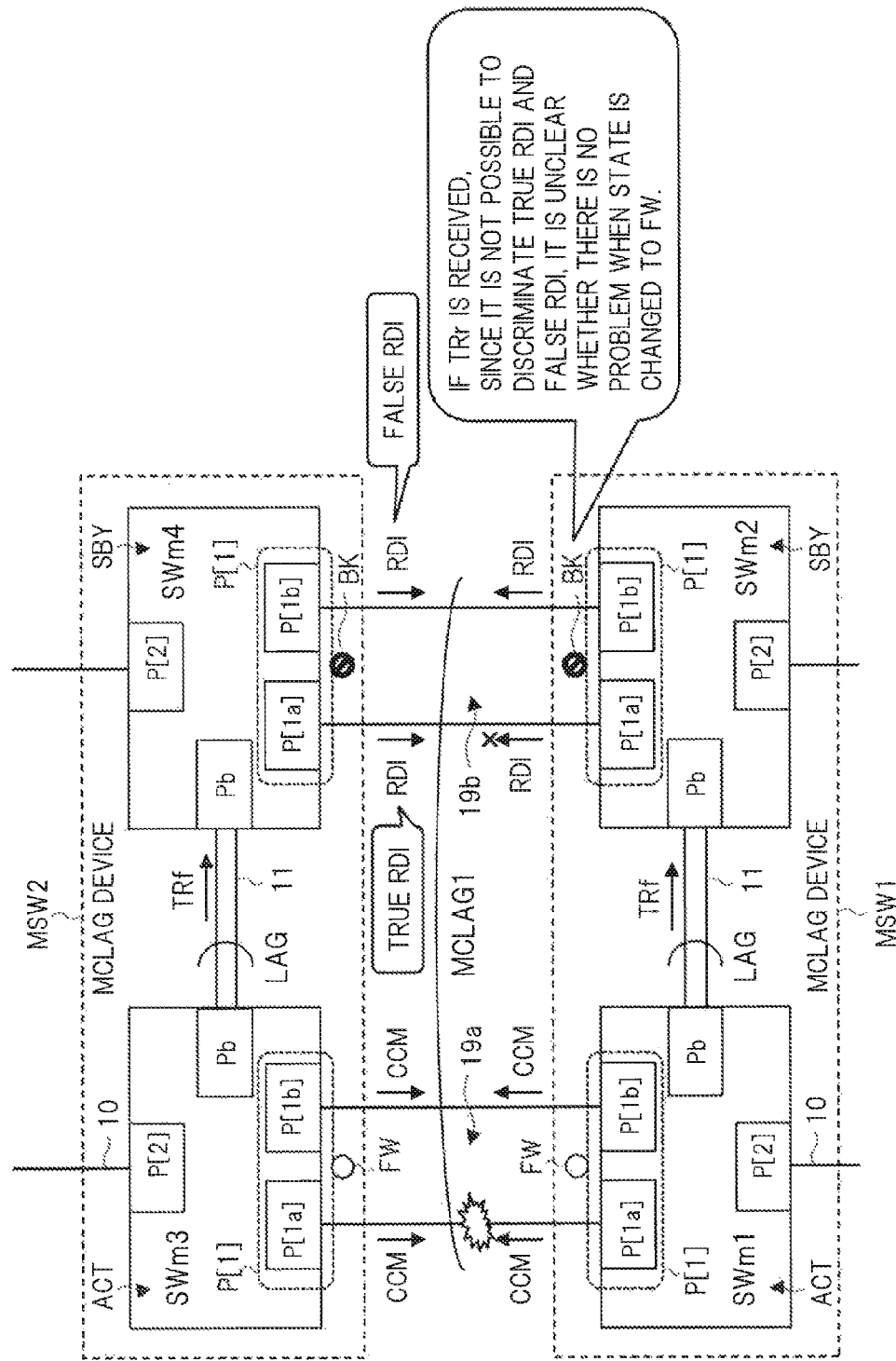
FIG. 9 is an explanatory diagram showing an example of a problem studied as a premise of the relay system of FIG. 5.

FIG. 9 is an explanatory diagram showing an example of a problem studied as a premise of the relay system of FIG. 5. As described in the first embodiment, the MCLAG devices MSW1 and MSW2 transmit the RDI from the MCLAG port group controlled to the transmission/reception prohibited state BK. Therefore, as shown in FIG. 9, there is a threat that the L2 switching devices SWm2 and SWm4 on the standby SBY side cannot determine whether there is no problem when their own MCLAG port groups P[1] are changed to the transmission/reception permitted state FW when the L2 switching devices SWm2 and SWm4 receive the fault notification frame TRf from each of the L2 switching devices SWm1 and SWm3 on the active ACT side.

Specifically, the case in which a communication path from the MCLAG port P[1a] of the L2 switching device SWm2 has a fault as shown in FIG. 9 is assumed. In this case, the RDI transmitted from the MCLAG port P[1a] of the L2 switching device SWm4 is a true RDI based on the fault of the transmission path. Meanwhile, the RDI transmitted from the MCLAG port P[1b] of the L2 switching device SWm4 is a false RDI based on the operation of the transmission stop instructing unit 18. If the L2 switching device SWm2 receives the true RDI, it does not change the MCLAG port group P[1] to the transmission/reception permitted state FW. However, the L2 switching device SWm2 essentially cannot discriminate the true RDI and the false RDI.

Thus, the relay system of the second embodiment has the mode retaining unit 21 as shown in FIG. 5. Then, when the opposing two redundancy devices are both made up of the MCLAG devices MSW1 and MSW2 of the present embodiment, the mode retaining unit 21 of either or both of the MCLAG devices MSW1 and MSW2 is made to retain the inactive mode (second mode) in advance. For example, when each of the L2 switching devices SWm3 and SWm4 constituting the MCLAG device MSW2 is made to retain the inactive mode (second mode), the MCLAG device MSW2 transmits the CCM control frame like the redundancy device 20 of the first embodiment. Specifically, since the RDI transmitted from the MCLAG device MSW2 is always the true RDI, the problem described with reference to FIG. 9 does not occur.

Also, the transmission stop instructing unit 18 is provided in order to instruct a general-purpose redundancy device to stop the transmission operation. However, when the two MCLAG devices MSW1 and MSW2 are used and the setting of active and standby is the same in the opposing L2 switching devices as shown in FIG. 5, the transmission operation of each L2 switching device stops based on the setting of active and standby. Therefore, even when the inactive mode (second mode) is retained for both of the MCLAG devices MSW1 and MSW2 (namely, when the transmission stop instructing unit 18 is not used at all), any problem does not occur in particular. Hereinafter, various operations will be described based on the example in which the inactive mode (second mode) is retained for both of the MCLAG devices MSW1 and MSW2.

<<General Operation of Relay System (in the Absence of Fault) (Modification Example)>>

Figure 6:
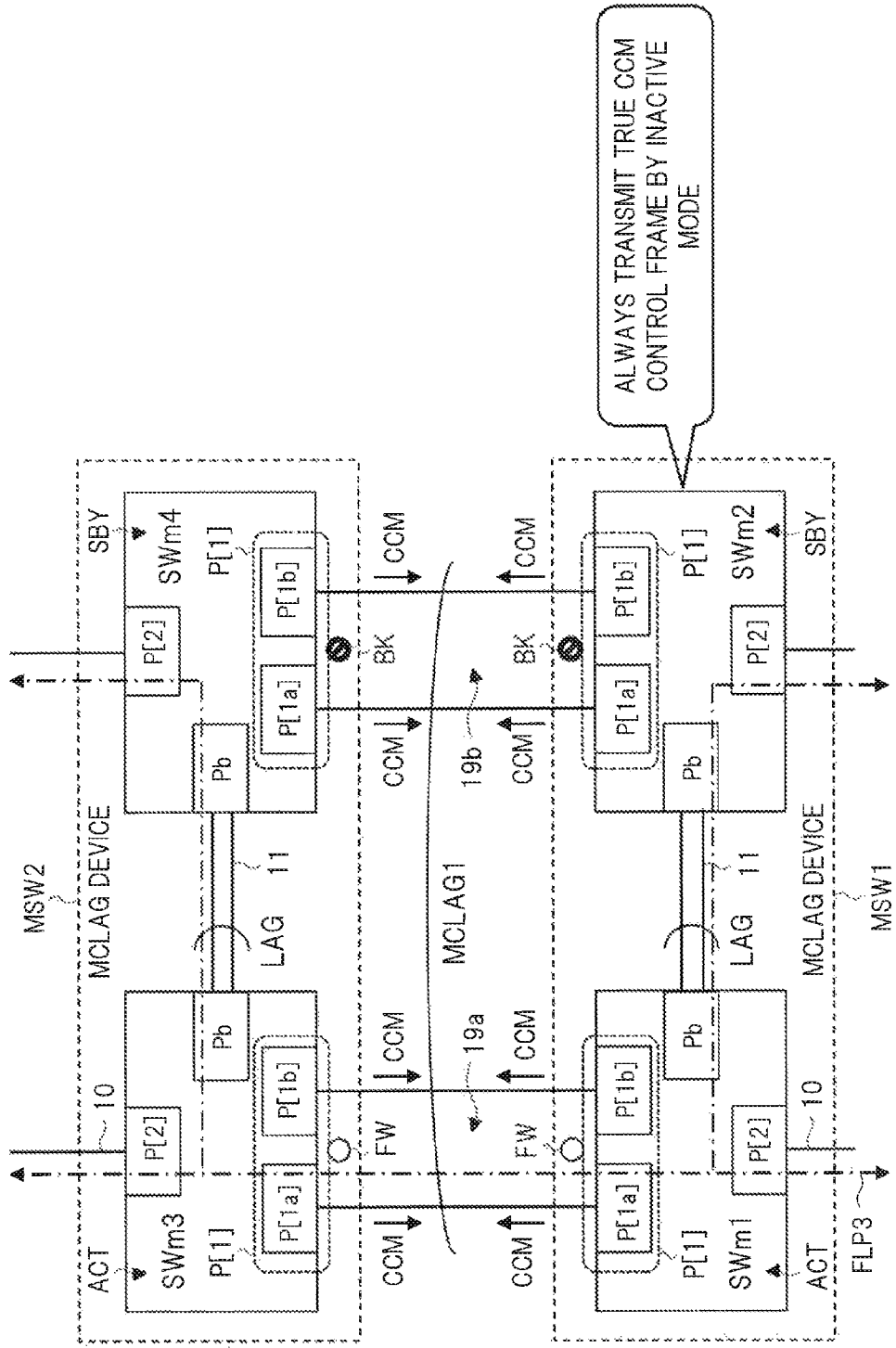
FIG. 6 is an explanatory diagram schematically showing an operation example in the absence of fault in the relay system of FIG. 5.

FIG. 6 is an explanatory diagram schematically showing an operation example in the absence of fault in the relay system of FIG. 5. The case of FIG. 6 is different from the above-described case of FIG. 2 in that the L2 switching device SWm2 transmits the CCM at regular intervals from each of the MCLAG ports P[1a] and P[1b] constituting the MCLAG port group P[1] controlled to the transmission/reception prohibited state BK based on the inactive mode (second mode). Also, the L2 switching device SWm4 also transmits the CCM at regular intervals from each of the MCLAG ports P[1a] and P[1b] constituting the MCLAG port group P[1] controlled to the transmission/reception prohibited state BK based on the inactive mode (second mode).

The L2 switching devices SWm2 and SWm4 both receive the CCM at the MCLAG ports P[1a] and P[1b], but since the MCLAG port group P[1] is controlled to the transmission/reception prohibited state BK, they do not transmit the frame (user frame) from the port group. As a result, a communication path FLP3 of the frame (user frame) as shown in FIG. 6 is formed between the MCLAG device MSW1 and the MCLAG device MSW2.

The communication path FLP3 corresponds to the path obtained by adding a communication path in the MCLAG device MSW2 to the communication path FLP1 shown in FIG. 2. In the MCLAG device MSW2, the communication path is defined in the same manner as that in the MCLAG device MSW1. For example, the case in which a frame is transmitted from the MCLAG device MSW1 to the MCLAG device MSW2 like the case of FIG. 2 and the MCLAG device MSW2 receives the frame at the MCLAG port group P[1] of the L2 switching device SWm3 is assumed.

The L2 switching device SWm3 learns a source MAC address of the frame received at the MCLAG port group P[1] in association with the MCLAG identifier {MCLAG1} to the address table FDB, and retrieves a destination port corresponding to a destination MAC address from the address table FDB. As a result, the L2 switching device SWm3 acquires the port identifier {P[2]} or the port identifier {Pb} as the destination port.

When the port identifier {P[2]} is acquired as the destination port, the L2 switching device SWm3 relays the frame to the port P[2]. Meanwhile, when the port identifier {Pb} is acquired as the destination port, the L2 switching device SWm3 adds the reception port identifier {MCLAG1} to the frame and then relays the frame to the bridge port Pb. The L2 switching device SWm4 learns a source MAC address of the frame received at the bridge port Pb in association with the reception port identifier {MCLAG1} added to the frame to the address table FDB. Also, the L2 switching device SWm4 retrieves a destination port corresponding to a destination MAC address of the frame from the address table FDB and relays the frame to the port P[2] acquired from the retrieval result.

Next, the case in which the MCLAG device MSW2 transmits a frame to the MCLAG device MSW1 like the case of FIG. 2 is assumed. As an example thereof, the case in which the L2 switching device SWm3 receives the frame at the port P[2] is assumed. The L2 switching device SWm3 learns a source MAC address of the frame in association with the port identifier {P[2]} to the address table FDB, and retrieves a destination port corresponding to a destination MAC address from the address table FDB. As the retrieval result of the destination port, the L2 switching device SWm3 acquires the MCLAG identifier {MCLAG1}.

Since its own MCLAG port group P[1] corresponding to the MCLAG identifier {MCLAG1} is controlled to the transmission/reception permitted state FW, the L2 switching device SWm3 relays the frame to one MCLAG port selected from the MCLAG ports based on a predetermined distribution rule. Thereafter, the frame is relayed like the case of FIG. 2.

Furthermore, as another example, the case in which the L2 switching device SWm4 receives a frame at the port P[2] is assumed. The L2 switching device SWm4 learns a source MAC address of the frame in association with the port identifier {P[2]} to the address table FDB, and retrieves a destination port corresponding to a destination MAC address from the address table FDB. As the retrieval result of the destination port, the L2 switching device SWm4 acquires the MCLAG identifier {MCLAG1}. Since its own MCLAG port group P[1] corresponding to the MCLAG identifier {MCLAG1} is controlled to the transmission/reception prohibited state BK, the L2 switching device SWm4 relays the frame to the bridge port Pb.

The L2 switching device SWm3 learns a source MAC address of the frame received at the bridge port Pb in association with the port identifier {Pb} to the address table FDB, and retrieves a destination port corresponding to a destination MAC address from the address table FDB. As the retrieval result of the destination port, the L2 switching device SWm3 acquires the MCLAG identifier {MCLAG1}. Since its own MCLAG port group P[1] corresponding to the MCLAG identifier {MCLAG1} is controlled to the transmission/reception permitted state FW, the L2 switching device SWm3 relays the frame to one MCLAG port selected from the MCLAG ports based on a predetermined distribution rule. Thereafter, the frame is relayed like the case of FIG. 2.

<<General Operation of Relay System (in the Occurrence of Fault at MCLAG Port Group) (Modification Example)>>

Figure 7:
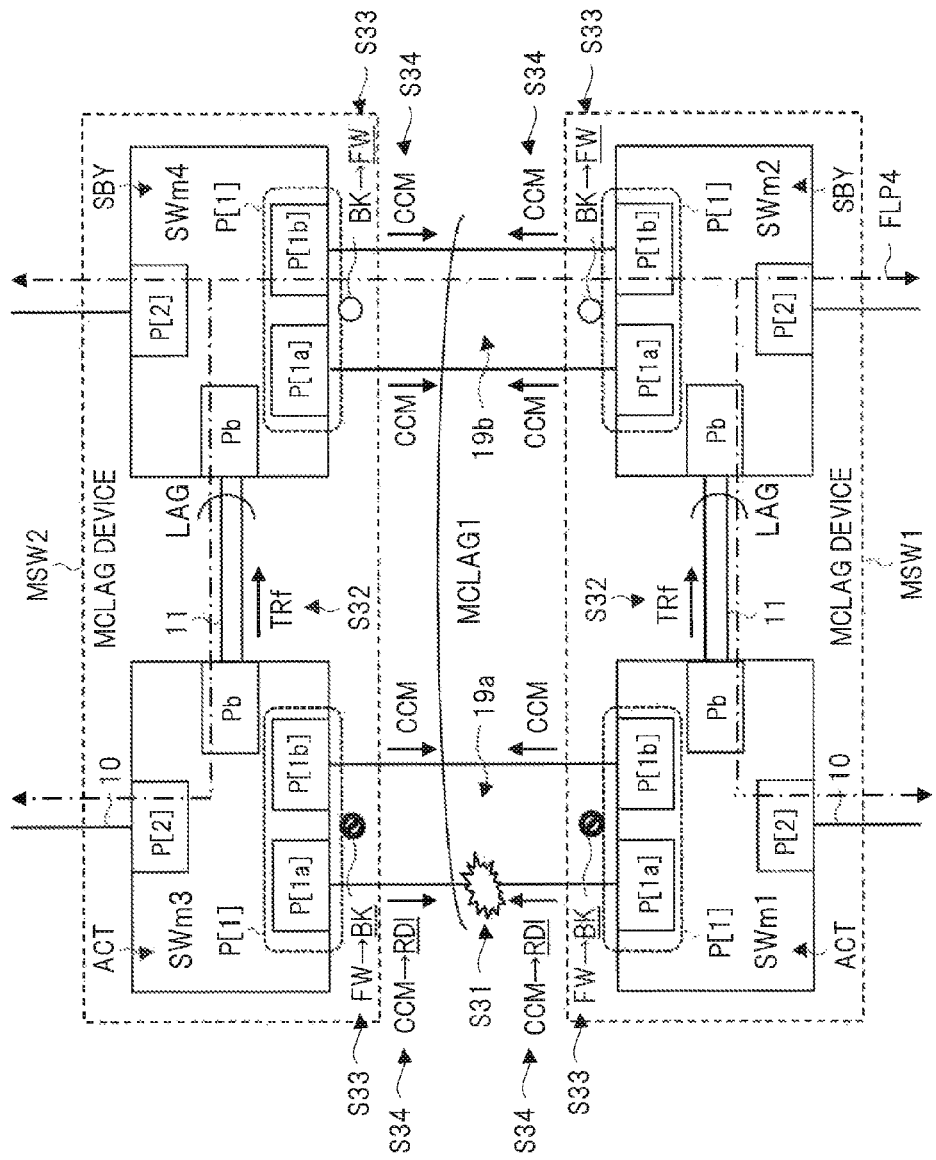
FIG. 7 is an explanatory diagram schematically showing an operation example in the case of occurrence of a fault at a MCLAG port group in the relay system of FIG. 5.

FIG. 7 is an explanatory diagram schematically showing an operation example in the case of occurrence of a fault at a MCLAG port group in the relay system of FIG. 5. Here, the case in which a fault occurs on the communication line 10 connected to the MCLAG port P[1a] of the L2 switching device SWm1 in the state of the absence of fault shown in FIG. 6 is taken as an example.

In this case, like the case of FIG. 3, the detection of fault occurrence (step S31) and the transmission of the fault notification frame TRf (step S32) are first carried out in the MCLAG device MSW1. In response to this, like the case of FIG. 3, the L2 switching device SWm1 controls the MCLAG port group P[1] to the transmission/reception prohibited state BK instead of the transmission/reception permitted state FW (step S33). Meanwhile, since the the L2 switching device SWm2 receives the fault notification frame TRf and receives also the CCM at the MCLAG port group P[1] (namely, it is determined that the MCLAG port group P[1] has no fault), the L2 switching device SWm2 controls the MCLAG port group P[1] to the transmission/reception permitted state FW instead of the transmission/reception prohibited state BK (step S33).

Also in the MCLAG device MSW2, like the case of the MCLAG device MSW1, the detection of fault occurrence (step S31) and the transmission of the fault notification frame TRf (step S32) are carried out. In response to this, the L2 switching device SWm3 controls the MCLAG port group P[1] to the transmission/reception prohibited state BK instead of the transmission/reception permitted state FW (step S33). Meanwhile, since the L2 switching device SWm4 receives the fault notification frame TRf and receives also the CCM at the MCLAG port group P[1] (namely, it is determined that the MCLAG port group P[1] has no fault), the L2 switching device SWm4 controls the MCLAG port group P[1] to the transmission/reception permitted state FW instead of the transmission/reception prohibited state BK (step S33).

Here, unlike the case of FIG. 3, each of the L2 switching devices SWm1 and SWm3 transmits the RDI instead of the CCM from the MCLAG port P[1a] at which the fault occurrence is detected in accordance with the inactive mode (second mode), but it transmits the CCM from the MCLAG port P[1b] at which the fault occurrence is not detected (step S34). Even when the CCM is transmitted and received in this manner, each of the L2 switching devices SWm1 and SWm3 does not transmit the user frame from the MCLAG port group P[1] due to the transmission/reception prohibited state BK.

Also, unlike the case of FIG. 3, each of the L2 switching devices SWm2 and SWm4 already transmits the CCM from the MCLAG port group P[1] in accordance with the inactive mode (second mode) before receiving the fault notification frame TRf. Therefore, each of the L2 switching devices SWm2 and SWm4 maintains the transmission of the CCM (step S34).

As a result, a communication path FLP4 of the frame (user frame) as shown in FIG. 7 is formed between the MCLAG device MSW1 and the MCLAG device MSW2. The communication path FLP4 corresponds to the path obtained by adding a communication path in the MCLAG device MSW2 to the communication path FLP2 shown in FIG. 3. In the MCLAG device MSW2, the communication path is defined in the same manner as that in the MCLAG device MSW1.

<<General Operation of Relay System (in the Recovery from Fault at MCLAG Port Group) (Modification Example)>>

Figure 8:
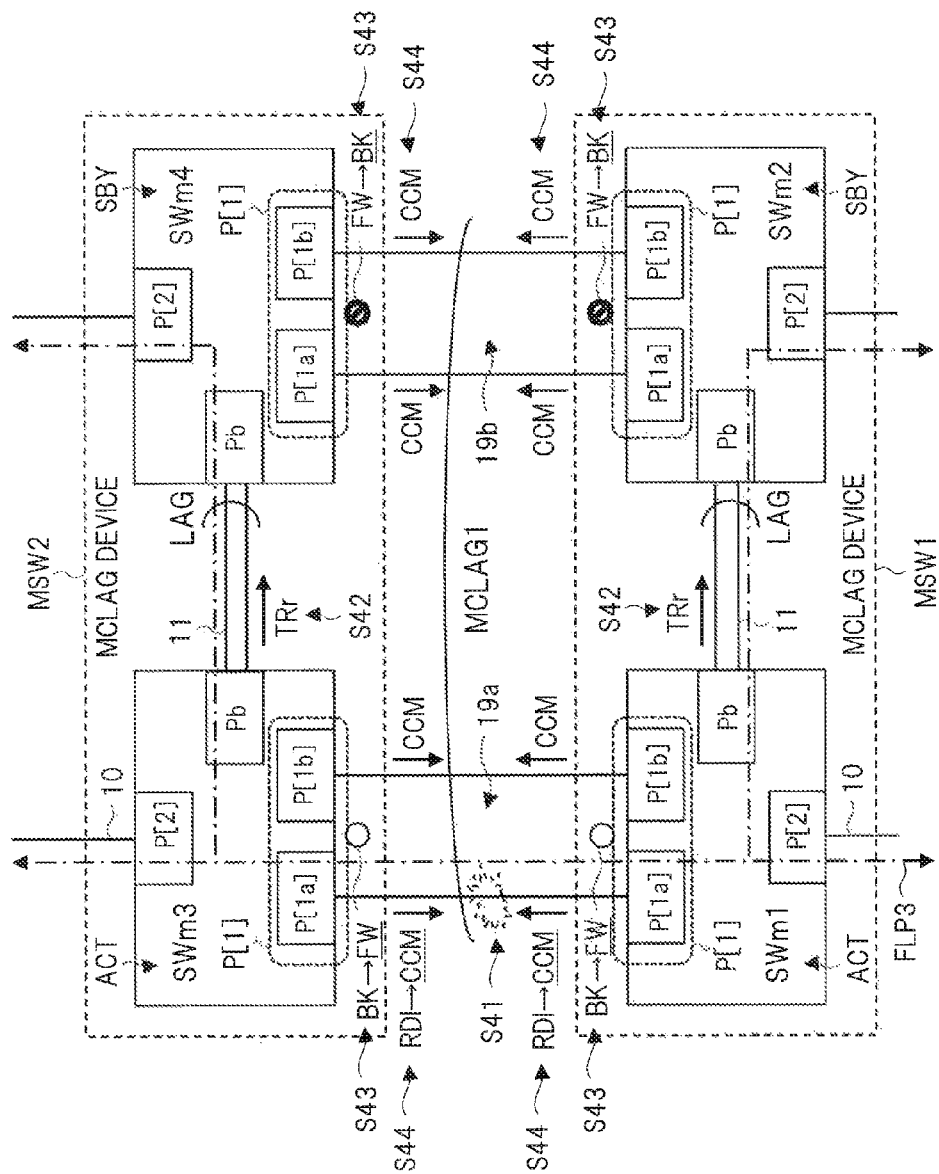
FIG. 8 is an explanatory diagram schematically showing an operation example in the case of recovery from fault at a MCLAG port group in the relay system of FIG. 5.

FIG. 8 is an explanatory diagram schematically showing an operation example in the case of recovery from fault at a MCLAG port group in the relay system of FIG. 5. Here, the case in which the fault shown in FIG. 7 is recovered is taken as an example.

In this case, like the case of FIG. 4, the detection of fault recovery (step S41) and the transmission of the fault recovery frame TRr (step S42) are first carried out in the MCLAG device MSW1. In response to this, like the case of FIG. 4, the L2 switching device SWm1 controls the MCLAG port group P[1] to the transmission/reception permitted state FW instead of the transmission/reception prohibited state BK, and the L2 switching device SWm2 controls the MCLAG port group P[1] to the transmission/reception prohibited state BK instead of the transmission/reception permitted state FW (step S43).

Also in the MCLAG device MSW2, like the case of the MCLAG device MSW1, the detection of fault recovery (step S41) and the transmission of the fault recovery frame TRr (step S42) are carried out. In response to this, the L2 switching device SWm3 controls the MCLAG port group P[1] to the transmission/reception permitted state FW instead of the transmission/reception prohibited state BK, and the L2 switching device SWm4 controls the MCLAG port group P[1] to the transmission/reception prohibited state BK instead of the transmission/reception permitted state FW (step S43).

Here, like the case of FIG. 4, each of the L2 switching devices SWm1 and SWm3 transmits the CCM instead of the RDI from the MCLAG port P[1a] at which the recovery from fault is detected (step S44). Also, unlike the case of FIG. 4, since each of the L2 switching devices SWm1 and SWm3 already transmits the CCM from the MCLAG port P[1b] in accordance with the inactive mode (second mode), the transmission of the CCM is maintained (step S44). Meanwhile, each of the L2 switching devices SWm2 and SWm4 maintains the CCM transmitted from the MCLAG port group P[1] in accordance with the inactive mode (second mode) unlike the case of FIG. 4 (step S44).

As a result, the communication path FLP3 of the frame (user frame) similar to that of the case of FIG. 6 is formed between the MCLAG device MSW1 and the MCLAG device MSW2 as shown in FIG. 8.

As described above, by using the relay system and the switching device of the second embodiment, various effects described in the first embodiment can be achieved even when the MCLAG devices of the present embodiment are used as redundancy devices and the redundancy devices are connected.

Third Embodiment

In the third embodiment, details of the L2 switching devices of the first embodiment and the second embodiment will be described.

<<Configuration of Switching Device (MCLAG Device)>>

Figure 10:
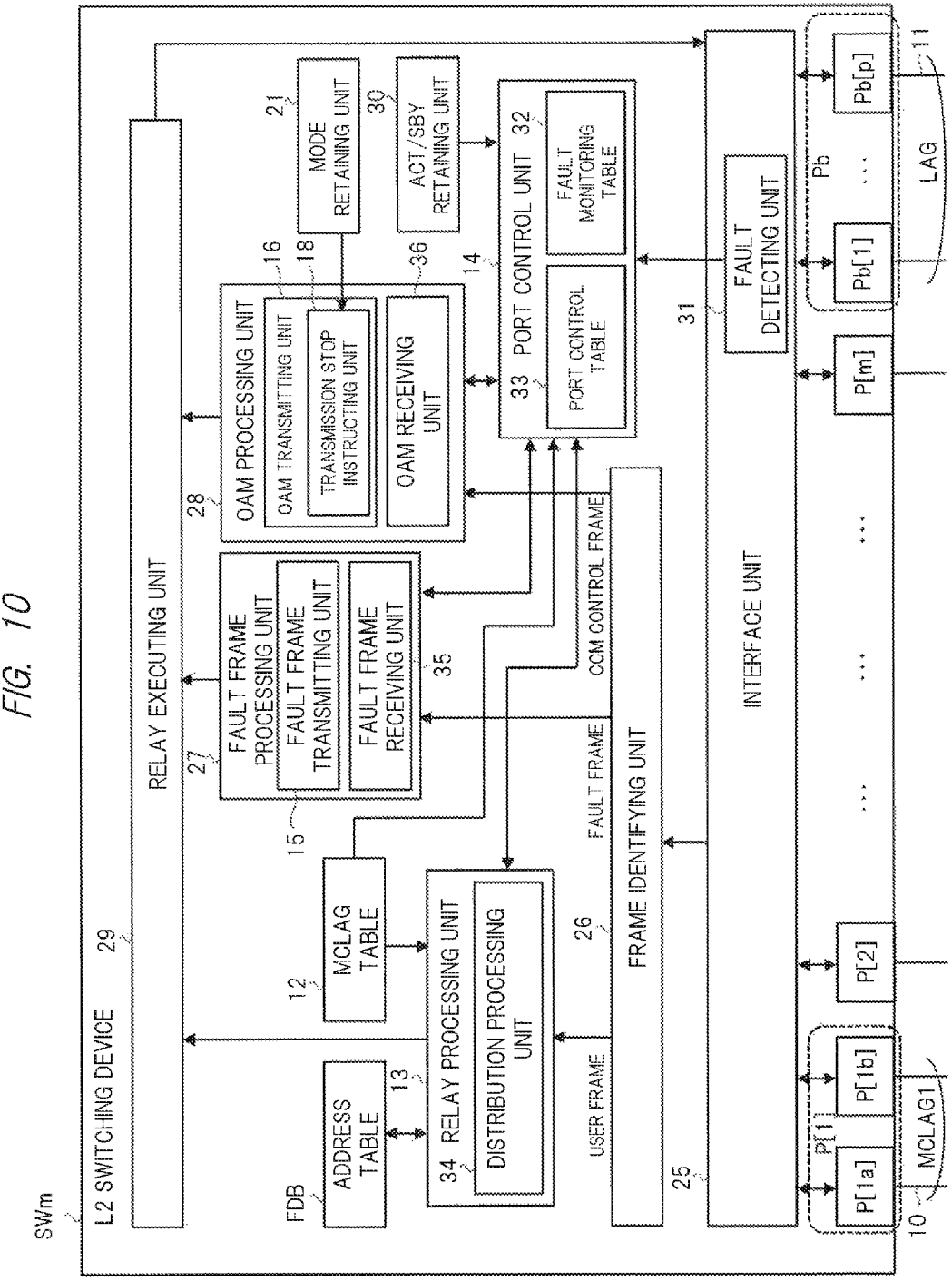
FIG. 10 is a block diagram showing a configuration example of the principal part of each switching device constituting a MCLAG device in a switching device according to the third embodiment of the present invention.

FIG. 10 is a block diagram showing a configuration example of the principal part of each switching device constituting a MCLAG device in a switching device according to the third embodiment of the present invention. Here, each of the L2 switching devices SWm1 to SWm4 constituting the MCLAG device in the relay system of FIG. 5 is taken as an example. FIG. 11A is a schematic diagram of a configuration example of the address table of FIG. 10, FIG. 11B is a schematic diagram of a configuration example of a fault monitoring table of FIG. 10, and FIG. 11C is a schematic diagram of a configuration example of a port control table of FIG. 10.

The L2 switching device (first or second switching device) SWm shown in FIG. 10 includes a MCLAG port group (first port group) P[1], a plurality of ports P[2] to P[m], the bridge port Pb, various processing units, and various tables. The MCLAG port group P[1] is made up of a plurality of (in this case, two) MCLAG ports P[1a] and P[1b]. In this example, the bridge port Pb is made up of a plurality of bridge ports Pb[1] to Pb[p]. The plurality of bridge ports Pb[1] to Pb[p] function as virtually one port by setting the LAG thereon. Each of the plurality of ports P[2] to P[m] may be the MCLAG port group like the case of P[1]. Hereinafter, various processing units and tables will be described.

An interface unit 25 has a reception buffer and a transmission buffer, and transmits and receives a frame to and from each of the ports (MCLAG ports P[1a] and P[1b], the plurality of ports P[2] to P[m] and the bridge port Pb). When receiving a frame at a port, the interface unit 25 adds a port identifier representing the port having received the frame (i.e., reception port identifier) to the frame. Also, the interface unit 25 has a fault detecting unit 31. The fault detecting unit 31 takes apart of the function of the fault monitoring unit 17 described with reference to FIG. 1 and others. The fault detecting unit 31 detects the fault occurrence at each port (P[1a], P[1b], P[2] to P[m] and Pb[1] to Pb[p]) with the use of hardware such as a detection circuit of the signal intensity of a received signal and a detection circuit of a pulse signal such as FLP. The information of the detected fault is reflected on a fault monitoring table 32 provided in the port control unit 14.

A frame identifying unit 26 identifies whether the frame received at each port (P[1a], P[1b], P[2] to P[m] and Pb [1] to Pb[p]) and transmitted through the reception buffer of the interface unit 25 is a user frame, a fault frame or a CCM control frame. The user frame means, for example, an ordinary frame transferred through the communication path FLP1 shown in FIG. 2. The fault frame means, for example, the fault notification frame TRf shown in FIG. 3 and the fault recovery frame TRr shown in FIG. 4. The CCM control frame means, for example, the CCM and RDI based on the Ethernet OAM as described above.

Though not particularly limited, the frame identifying unit 26 identifies the user frame, the fault frame and the CCM control frame based on a frame type and a destination MAC address (for example, destined for MCLAG device or not) contained in the frame. When the frame is identified as a user frame, the frame identifying unit 26 transmits the user frame to the relay processing unit 13. Also, when the frame is identified as a fault frame, the frame identifying unit 26 transmits the fault frame to a fault frame processing unit 27. Further, when the frame is identified as a CCM control frame, the frame identifying unit 26 transmits the CCM control frame to an OAM processing unit 28.

The fault frame processing unit 27 includes a fault frame receiving unit 35 and a fault frame transmitting unit 15. The fault frame receiving unit 35 detects the fault occurrence and the recovery from fault at a MCLAG port group of another L2 switching device (in this specification, referred to as peer device) connected to the bridge port Pb and constituting the MCLAG device together with its own switching device based on the fault frame from the peer device. The information of the detected fault is reflected on the fault monitoring table 32 provided in the port control unit 14.

The OAM processing unit 28 includes an OAM receiving unit 36 and an OAM transmitting unit 16 and performs various processes based on the Ethernet OAM. As one of the processes, the OAM processing unit 28 monitors the continuity between each MEP by transmitting and receiving a CCM control frame at regular intervals between the MEP set in advance. The OAM receiving unit 36 detects the fault occurrence and recovery from fault at each of the ports based on the reception state of the CCM control frame from the L2 switching device connected to the MCLAG ports P[1a] and P[1b] and the plurality of ports P[2] to P[m].

Specifically, the OAM receiving unit 36 detects the fault occurrence at the port based on non-reception of the CCM control frame at a certain port within a predetermined period. Also, the OAM receiving unit 36 detects the fault occurrence at the port based on reception of the RDI at a certain port. The information of the detected fault is reflected on the fault monitoring table 32 provided in the port control unit 14. The OAM receiving unit 36 takes another part of the function of the fault monitoring unit 17 described with reference to FIG. 1 and others together with the above-mentioned fault detecting unit 31.

An ACT/SBY retaining unit 30 retains setting information of active ACT or standby SBY in units of device (or in units of MCLAG port group) determined in advance by the administrator, etc. The MCLAG table 12 retains the MCLAG ports P[1a] and P[1b] of its own switching device in association with a MCLAG identifier {MCLAG1} as shown in FIG. 1.

The port control unit 14 controls the state of each MCLAG port group based on the information of the MCLAG table 12, the information of the fault frame receiving unit 35, the information of the OAM receiving unit 36, the information of the fault detecting unit 31 and the information of the ACT/SBY retaining unit 30 as described in the first embodiment and others. Specifically, the port control unit 14 includes the fault monitoring table 32 and a port control table 33.

The fault monitoring table 32 retains the fault state (for example, presence and absence of fault) of each port (for example, MCLAG port P[1a]) of its own switching device and the fault state of the MCLAG port group of the peer device (SWm2) as shown in FIG. 11B. The MCLAG port group of the peer device (SWm1) is identified by using, for example, the MCLAG identifier {MCLAG1} thereof. The fault state of each port of its own switching device is determined by the detection result of the fault detecting unit 31 and the OAM receiving unit 36 corresponding to the fault monitoring unit 17 of FIG. 1. The fault state of the MCLAG port group of the peer device is determined by the fault frame receiving unit 35.

The port control unit 14 controls the state of the MCLAG port of its own switching device based on the information of the fault monitoring table 32 and the information of the ACT/SBY retaining unit 30, and manages the control state thereof on the port control table 33. In the port control table 33 of FIG. 11C (and the fault monitoring table 32 of FIG. 11B), the L2 switching device SWm2 of FIG. 3 is taken as an example, and the MCLAG port group P[1] corresponding to the MCLAG identifier {MCLAG1} is controlled to the transmission/reception permitted state FW.

When the fault state of the MCLAG port group P[1] of its own switching device is changed from the absence of fault to the presence of fault based on the fault monitoring table 32, the fault frame transmitting unit 15 of the fault frame processing unit 27 generates the fault notification frame TRf containing the information of the place of fault occurrence. Also, when the fault state of the MCLAG port group P[1] of its own switching device is changed from the presence of fault to the absence of fault based on the fault monitoring table 32, the fault frame transmitting unit 15 generates the fault recovery frame TRr containing the information of the place of fault recovery. For example, the fault frame transmitting unit adds a destination port identifier {Pb} representing the destination port to the generated fault frame and then transmits the fault frame to a relay executing unit 29.

The OAM transmitting unit 16 of the OAM processing unit 28 has the transmission stop instructing unit 18. The mode retaining unit 21 determines activation and inactivation of the operation of the transmission stop instructing unit 18. When the transmission stop instructing unit 18 is inactive (inactive mode (second mode)), the OAM transmitting unit 16 transmits the CCM control frame in conformity to the standard of the Ethernet OAM regardless of the control state of the MCLAG port group P[1]. Meanwhile, when the transmission stop instructing unit 18 is active (active mode (first mode)), the OAM transmitting unit 16 transmits the CCM control frame in accordance with the control state of the MCLAG port group P[1] based on the port control table 33. At this time, in the example of FIG. 10, the OAM transmitting unit 16 adds the port identifier of the corresponding MCLAG port to each generated CCM control frame as the destination port identifier, and then transmits the CCM control frame to the relay executing unit 29.

When the transmission stop instructing unit 18 is active, the OAM transmitting unit 16 specifically performs the following processes. First, when the MCLAG port group P[1] is controlled to the transmission/reception permitted state FW, the GAM transmitting unit 16 transmits the CCM control frame in conformity to the standard of the Ethernet OAM from one or a plurality of MCLAG ports constituting the MCLAG port group P[1]. Meanwhile, when the MCLAG port group P[1] is controlled to the transmission/reception prohibited state BK, the OAM transmitting unit 16 transmits the RDI at regular intervals from each of one or a plurality of MCLAG ports constituting the MCLAG port group P[1].

Note that the OAM processing unit 28 can monitor the continuity of a normal port (for example, P[2]) and the bridge port Pb based on the CCM control frame in addition to that of the MCLAG port. At this time, the OAM processing unit 28 performs the process in conformity to the standard of the Ethernet OAM.

The relay processing unit 13 includes the distribution processing unit 18. The relay processing unit 13 performs the learning and retrieval on the address table FDB for the user frame from the frame identifying unit 26 as described in the first embodiment and others, and determines the destination port in view of the information of the port control unit 14 (for example, port control table 33).

Specifically, in the learning to the address table, the relay processing unit 13 learns a source MAC address of a user frame in association with the reception port identifier added in the interface unit 25 to the address table FDB. At this time, when the reception port identifier is the port identifier of the MCLAG port based on the MCLAG table 12, the relay processing unit 13 learns the port identifier in place of the MCLAG identifier to the address table FDB.

Also, when the relay processing unit 13 receives the user frame, to which the reception port identifier (MCLAG identifier) is added, at the bridge port Pb, the relay processing unit 13 learns a source MAC address thereof in association with the reception port identifier to the address table FDB. As a result, the address table FDB retains the correspondence relation between a port and a MAC address present ahead of the port as shown in FIG. 11A. In FIG. 11A, the port is retained as the port identifier thereof (for example, {P[2]}) or the MCLAG identifier (for example, {MCLAG1}). Note that the address table FDB actually retains a VLAN identifier in addition to the MAC address.

On the other hand, in the retrieval on the address table FDB, the relay processing unit 13 performs the retrieval on the address table FDB with using the destination MAC address (and VLAN identifier) of the user frame as a retrieval key, thereby acquiring the destination port. The relay processing unit 13 checks the control state of the destination port based on the port control table 33, and then determines the final destination port. For example, when the destination port by the retrieval result is the MCLAG identifier and the control state of the MCLAG port group corresponding to the MCLAG identifier is the transmission/reception permitted state FW based on the port control table 33, the relay processing unit 13 determines the MCLAG port of its own switching device as the final destination port.

Specifically, the final destination port is determined by a distribution processing unit 34. Though not particularly limited, the distribution processing unit 34 performs a hash operation using the source MAC address and the destination MAC address of the frame. The distribution processing unit 34 determines one MCLAG port as the final destination port among the MCLAG ports of the MCLAG port group corresponding to the MCLAG identifier serving as the destination port based on the result of the hash operation. The relay processing unit 13 adds the port identifier of the MCLAG port as the destination port identifier to the frame and then transmits the frame to the relay executing unit 29.

Meanwhile, when the destination port based on the retrieval result is the MCLAG identifier and the control state of the MCLAG port group corresponding to the MCLAG identifier is the transmission/reception prohibited state BK based on the port control table 33, the relay processing unit 13 determines the bridge port Pb as the final destination port. The replay processing unit 13 adds the port identifier {Pb} of the bridge port Pb to the frame and then transmits the frame to the relay executing unit 29.

The relay executing unit 29 transmits the user frame from the relay processing unit 13, the fault frame from the fault frame processing unit 27 or the CCM control frame from the GAM processing unit 28 to a predetermined transmission buffer in the interface unit 25. This predetermined transmission buffer is a buffer corresponding to the destination port identifier added to the frame. The transmission buffer in the interface unit 25 receives the frame from the relay executing unit 29 and transmits the frame to the corresponding port.

<<General Configuration of Switching Device (Redundancy Device)>>

Figure 12:
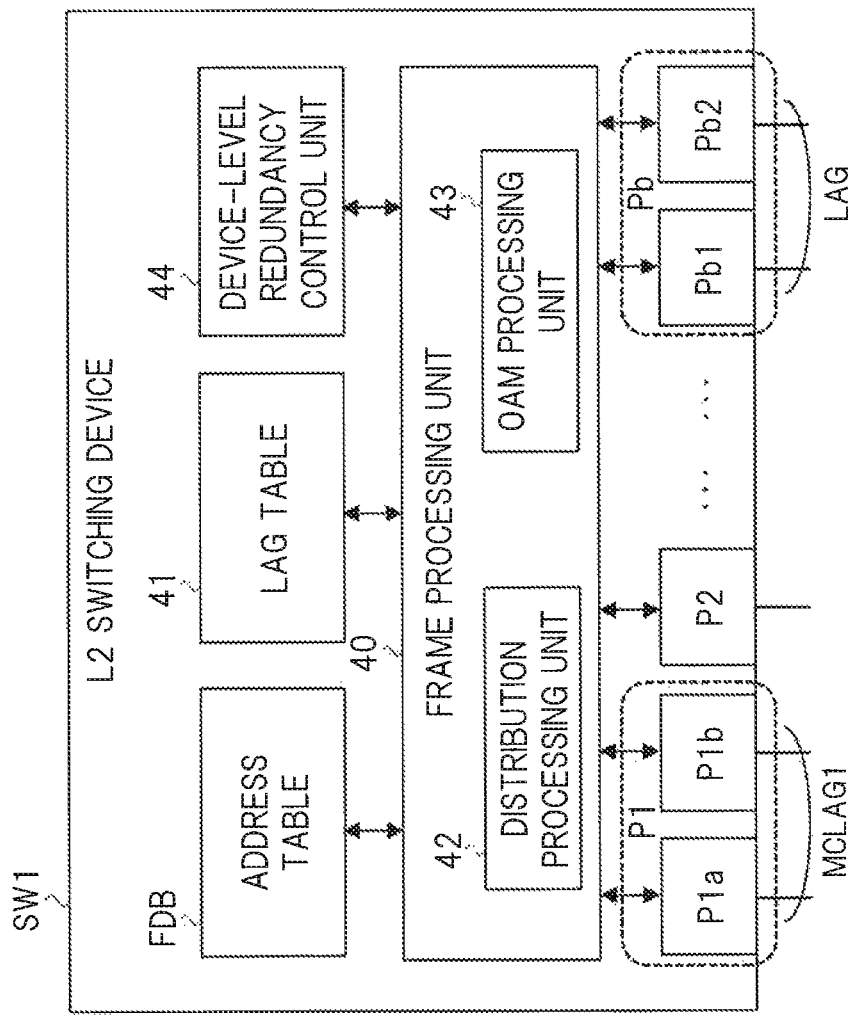
FIG. 12 is a block diagram showing a simplified configuration example of a general-purpose switching device constituting a redundancy device in the switching device according to the third embodiment of the present invention.

FIG. 12 is a block diagram showing a simplified configuration example of a general-purpose switching device constituting a redundancy device in the switching device according to the third embodiment of the present invention. Here, each of the L2 switching devices SW1 and SW2 constituting the redundancy device 20 in the relay system of FIG. 1 is taken as an example.

The L2 switching device (third or fourth switching device) SW1 shown in FIG. 12 includes a port group P1, a port P2, a bridge port Pb, a frame processing unit 40, an address table FDB, a LAG table 41 and a device-level redundancy control unit 44. As shown in FIG. 1, the port group P1 is made up of a plurality of ports (referred to as LAG ports in this case) P1a and P1b, and MCLAG1 is set on the port group P1. Also, the bridge port Pb is made up of a plurality of bridge ports Pb1 and Pb2 on which LAG is set.

The address table FDB retains the correspondence relation between a port (actually, port identifier or LAG identifier), a MAC address present ahead of the port and a VLAN identifier like the case of FIG. 11A. The LAG table 41 retains the correspondence relation between the LAG identifier and the port identifiers of member ports of the LAG identifier like the case of the MCLAG table 12 of FIG. 1. For example, the LAG table 41 retains the correspondence relation between the LAG identifier {LAG1} corresponding to the MCLAG1 and the port identifiers {P1a} and {P1b} of the member ports thereof.

When a frame is received at a predetermined port, the frame processing unit 40 performs learning and retrieval on the address table FDB with reference to the LAG table 41, and relays the frame to the destination port based on the retrieval result. Also, the frame processing unit 40 includes the distribution processing unit 42 and the OAM processing unit 43. As described in the first embodiment, the OAM processing unit 43 transmits and receives the CCM control frame (CCM, RDI) between MEP set in advance based on the normal standard of the Ethernet OAM, thereby monitoring the presence and absence of fault at each LAG port.

When relaying a frame to the LAG identifier {LAG1}, the distribution processing unit 42 selects one LAG port from the member ports thereof based on a predetermined distribution rule. The member ports are LAG ports determined to have no fault by the OAM processing unit 43 (namely, LAG ports receiving the CCM). The device-level redundancy control unit 44 performs various controls and processes required for achieving the device-level redundancy together with the L2 switching device connected to the bridge port Pb.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A relay system comprising:
   a first redundancy device made up of a first switching device and a second switching device; and
   a second redundancy device made up of a third switching device and a fourth switching device and connected to the first redundancy device,
   wherein the first switching device and the second switching device each have a first port group made up of one or a plurality of first ports, a second port and a bridge port, the first switching device and the second switching device being connected to each other by a communication line via the bridge ports, the third switching device has a first link with the first port group of the first switching device and has no link with the second switching device, the fourth switching device has a second link with the first port group of the second switching device and has no link with the first switching device, and a communication between the first redundancy device and the second redundancy device is performed through the first link when the first link has no fault, and the communication is performed through the second link when the first link has a fault and the second link has no fault.

2. The relay system according to claim 1, wherein each of the first switching device and the second switching device includes a port control unit which controls the first port group to a first state in which transmission and reception are both permitted or a second state in which transmission and reception are both prohibited in accordance with whether the first port group is set to active or standby, and the first port group of the first switching device is set to the active and the first port group of the second switching device is set to the standby.

3. The relay system according to claim 2, wherein each of the first switching device and the second switching device further includes an OAM transmitting unit which transmits a RDI frame serving as one of CCM control frames based on Ethernet OAM from each of the one or the plurality of first ports constituting the first port group controlled to the second state.

4. The relay system according to claim 3, wherein each of the first switching device and the second switching device further includes a mode retaining unit which retains a first mode or a second mode, and when the first mode is retained, the OAM transmitting unit transmits the RDI frame from each of the one or the plurality of first ports constituting the first port group controlled to the second state, and when the second mode is retained, the OAM transmitting unit transmits a CCM control frame in conformity to a standard of Ethernet OAM from each of the one or the plurality of first ports constituting the first port group controlled to the second state.

5. The relay system according to claim 4, wherein each of the first switching device and the second switching device further includes:

a fault monitoring unit which monitors presence and absence of fault at the first port group; and a fault frame transmitting unit which transmits a fault notification frame via the bridge port when a monitoring result by the fault monitoring unit is changed from absence of fault to presence of fault, in a first case in which the first port group is set to the active and when the monitoring result by the fault monitoring unit is absence of fault, the port control unit controls the first port group to the first state, and in the first case and when the monitoring result by the fault monitoring unit is presence of fault, the port control unit controls the first port group to the second state, and in a second case in which the first port group is set to the standby and when the fault notification frame is not received via the bridge port, the port control unit controls the first port group to the second state, and in the second case and when the fault notification frame is received via the bridge port and the monitoring result by the fault monitoring unit is absence of fault, the port control unit controls the first port group to the first state.

6. The relay system according to claim 4, wherein each of the first switching device and the second switching device further includes:

a MCLAG table which retains the one or the plurality of first ports in association with a first identifier; and a relay processing unit which, when the first port group is controlled to the first state, relays a frame containing the first identifier as a destination port to the first port group, and when the first port group is controlled to the second state, relays a frame containing the first identifier as a destination port to the bridge port.

7. The relay system according to claim 3, wherein each of the first switching device and the second switching device further includes:

a fault monitoring unit which monitors presence and absence of fault at the first port group; and a fault frame transmitting unit which transmits a fault notification frame via the bridge port when a monitoring result by the fault monitoring unit is changed from absence of fault to presence of fault, in a first case in which the first port group is set to the active and when the monitoring result by the fault monitoring unit is absence of fault, the port control unit controls the first port group to the first state, and in the first case and when the monitoring result by the fault monitoring unit is presence of fault, the port control unit controls the first port group to the second state, and in a second case in which the first port group is set to the standby and when the fault notification frame is not received via the bridge port, the port control unit controls the first port group to the second state, and in the second case and when the fault notification frame is received via the bridge port and the monitoring result by the fault monitoring unit is absence of fault, the port control unit controls the first port group to the first state.

8. The relay system according to claim 3, wherein each of the first switching device and the second switching device further includes:

a MCLAG table which retains the one or the plurality of first ports in association with a first identifier; and a relay processing unit which, when the first port group is controlled to the first state, relays a frame containing the first identifier as a destination port to the first port group, and when the first port group is controlled to the second state, relays a frame containing the first identifier as a destination port to the bridge port.

9. The relay system according to claim 2, wherein each of the first switching device and the second switching device further includes:

a fault monitoring unit which monitors presence and absence of fault at the first port group; and a fault frame transmitting unit which transmits a fault notification frame via the bridge port when a monitoring result by the fault monitoring unit is changed from absence of fault to presence of fault, in a first case in which the first port group is set to the active and when the monitoring result by the fault monitoring unit is absence of fault, the port control unit controls the first port group to the first state, and in the first case and when the monitoring result by the fault monitoring unit is presence of fault, the port control unit controls the first port group to the second state, and in a second case in which the first port group is set to the standby and when the fault notification frame is not received via the bridge port, the port control unit controls the first port group to the second state, and in the second case and when the fault notification frame is received via the bridge port and the monitoring result by the fault monitoring unit is absence of fault, the port control unit controls the first port group to the first state.

10. The relay system according to claim 2,
wherein each of the first switching device and the second switching device further includes:
a MCLAG table which retains the one or the plurality of first ports in association with a first identifier; and
a relay processing unit which, when the first port group is controlled to the first state, relays a frame containing the first identifier as a destination port to the first port group, and when the first port group is controlled to the second state, relays a frame containing the first identifier as a destination port to the bridge port.

11. A switching device having a first port group made up of a plurality of first ports, a second port and a bridge port and connected to a different switching device via the bridge port, the switching device comprising:
a port control unit which controls the first port group to a first state in which transmission and reception are both permitted or a second state in which transmission and reception are both prohibited in accordance with whether the first port group is set to active or standby;
a mode retaining unit which retains a first mode or a second mode; and
an OAM transmitting unit which transmits a RDI frame serving as one of CCM control frames based on Ethernet OAM from each of the one or the plurality of first ports constituting the first port group controlled to the second state when the first mode is retained, and transmits a CCM control frame in conformity to a standard of Ethernet OAM from each of the one or the plurality of first ports constituting the first port group controlled to the second state when the second mode is retained,
wherein the first port group of the switching device is set to the standby when a first port group of the different switching device is set to the active, and the first port group of the switching device is set to the active when the first port group of the different switching device is set to the standby.

12. The switching device according to claim 11, further comprising:
a fault monitoring unit which monitors presence and absence of fault at the first port group; and
a fault frame transmitting unit which transmits a fault notification frame via the bridge port when a monitoring result by the fault monitoring unit is changed from absence of fault to presence of fault,
wherein, in a first case in which the first port group is set to active and when the monitoring result by the fault monitoring unit is absence of fault, the port control unit controls the first port group to the first state, and in the first case and when the monitoring result by the fault monitoring unit is presence of fault, the port control unit controls the first port group to the second state, and
in a second case in which the first port group is set to standby and when the fault notification frame is not received via the bridge port, the port control unit controls the first port group to the second state, and in the second case and when the fault notification frame is received via the bridge port and the monitoring result by the fault monitoring unit is absence of fault, the port control unit controls the first port group to the first state.

13. The switching device according to claim 11, further comprising:
a MCLAG table which retains the one or the plurality of first ports in association with a first identifier; and
a relay processing unit which, when the first port group is controlled to the first state, relays a frame containing the first identifier as a destination port to the first port group, and when the first port group is controlled to the second state, relays a frame containing the first identifier as a destination port to the bridge port.

* * * * *